(12) United States Patent
Wei

(10) Patent No.: US 12,208,581 B2
(45) Date of Patent: Jan. 28, 2025

(54) HANDHELD 3D DRAWING ARRANGEMENT AND RECIPROCATING FILAMENT MOVING SYSTEM AND FILAMENT MOVING METHOD THEREOF

(71) Applicant: JIANGSU HAOYU ELECTRONIC TECHNOLOGY CO., LTD, Jiangsu (CN)

(72) Inventor: Honghui Wei, Jurong (CN)

(*) Notice: Subject to any disclaimer, the term of this patent is extended or adjusted under 35 U.S.C. 154(b) by 297 days.

(21) Appl. No.: 17/810,641

(22) Filed: Jul. 5, 2022

(65) Prior Publication Data
US 2023/0311416 A1  Oct. 5, 2023

(30) Foreign Application Priority Data

Apr. 1, 2022 (CN) .......................... 202210339245.1
Apr. 1, 2022 (CN) .......................... 202220746331.X

(51) Int. Cl.
| | | |
|---|---|---|
| B29C 67/00 | (2017.01) |
| B29C 64/321 | (2017.01) |
| B33Y 30/00 | (2015.01) |
| B33Y 40/00 | (2020.01) |
| B29K 55/02 | (2006.01) |
| B29K 67/00 | (2006.01) |

(52) U.S. Cl.
CPC ............ B29C 64/321 (2017.08); B33Y 30/00 (2014.12); B33Y 40/00 (2014.12); *B29K 2055/02* (2013.01); *B29K 2067/046* (2013.01)

(58) Field of Classification Search
CPC ..... B29C 64/321; B29C 64/25; B29C 64/393; B29C 48/05; B29C 48/2528; B29C 48/802; B33Y 30/00; B33Y 40/00; B33Y 50/02
See application file for complete search history.

(56) References Cited

U.S. PATENT DOCUMENTS

| | | | |
|---|---|---|---|
| 11,590,704 B1* | 2/2023 | Wei .......................... | B29C 64/25 |
| 2014/0154347 A1* | 6/2014 | Dilworth ................. | B29C 48/02 |
| | | | 425/87 |
| 2018/0154586 A1* | 6/2018 | Wang ..................... | B29C 64/218 |
| 2019/0193331 A1* | 6/2019 | Welling ................ | B29C 64/118 |

* cited by examiner

*Primary Examiner* — Thu Khanh T. Nguyen
(74) *Attorney, Agent, or Firm* — Tsz Lung Yeung

(57) ABSTRACT

A handheld 3D drawing arrangement includes a main body having a feeding pathway, a reciprocating filament moving system including a filament moving element, a heating system, and a controller, wherein under control of the controller, the reciprocating filament moving system is operated to allow the filament moving element to reciprocating move, so as to drive the filament to be feed to the heating system through the feeding pathway, so that the filament is heated and melted by the heating system for drawing the 3D object.

20 Claims, 17 Drawing Sheets

A

B

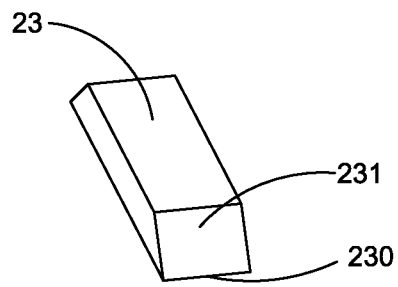
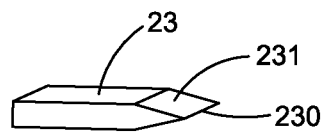
FIG.7B          FIG.7C
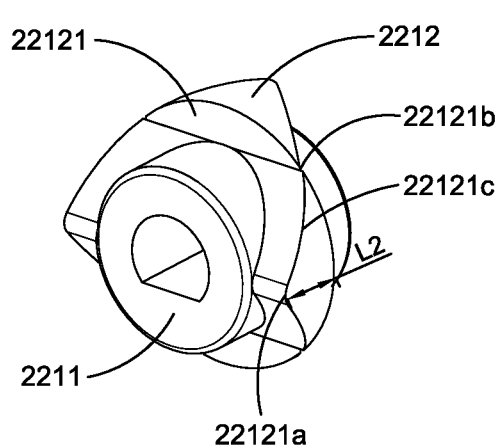
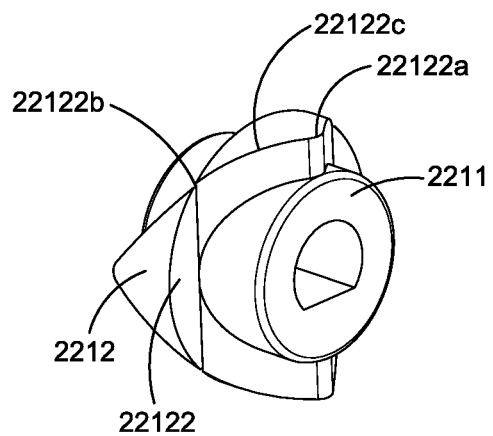
FIG.8A          FIG.8B

HANDHELD 3D DRAWING ARRANGEMENT AND RECIPROCATING FILAMENT MOVING SYSTEM AND FILAMENT MOVING METHOD THEREOF

CROSS REFERENCE OF RELATED APPLICATION

This application is a non-provisional application that claims priority under 35U.S.C. § 119 to China application number CN202210339245.1, filing date Apr. 1, 2022, and China application number CN202220746331.X, filing date Apr. 1, 2022, wherein the entire content of which are expressly incorporated herein by reference.

BACKGROUND OF THE PRESENT INVENTION

Field of Invention

The present invention relates to a 3D (Three Dimensional) drawing arrangement, and more particularly to a handheld 3D drawing arrangement and reciprocating filament moving system and filament moving method thereof.

Description of Related Arts

A handheld 3D drawing device, such as a 3D printing pen or a 3D drawing pen, can be controlled in a human hand through traditional drawing operations to create a 3D object on a surface of any object, or can even draw directly in the air. The operations does not require a control of a computer or related software, so that it is very convenient to use. The handheld 3D drawing devices have been widely used in architectural decoration materials, artistic creations, entertainment teachings and many other fields.

Currently, a typical conventional 3D printing pen includes a pen body, a control module, a filament feeding mechanism and a heating mechanism. During operation, a rod-shaped filament is inserted into a channel of the pen body, and the control module controls the filament feeding mechanism to drive the filament forward into the heating mechanism. After being heated and melted by the heating mechanism, the melted material is extruded from a nozzle of the pen body and is cooled to form a 3D object.

In order to ensure that the melted material is continuously extruded from the nozzle of the pen body for drawing 3D objects, it is necessary to continuously transmit the filament to the heating mechanism. However, the conventional feeding mechanism generally employs gears or screws to engage with the filament and drive the filament to move forward by a complex rotating gear group or a complex rotating screw driving arrangement. How to design a simple structure that can continuously and reliably transport the filament to move forward is a key factor for the handheld 3D drawing device to smoothly discharge the material to complete the 3D drawing. Moreover, when the conventional 3D printing pen loads the filament, due to the blocking of gears or screws, a front end of the filament can only be inserted into a position corresponding to the feeding mechanism and cannot be directly inserted into a position corresponding to the heating mechanism, so that an additional conveying step is required to move the front end of the filament to the position corresponding to the heating mechanism; when unloading the filament, it is also necessary to move the front end of the filament from the position corresponding to the heating mechanism to a position away from the feeding mechanism by reversing the rotating direction of the gears or screws before the filament can be removed from the main body of the pen, so that the operation is complicated and time consuming.

SUMMARY OF THE PRESENT INVENTION

The invention is advantageous in that it provides a handheld 3D drawing arrangement and reciprocating filament moving system and filament moving method thereof, wherein the reciprocating filament moving system urges a filament to move forward by means of a reciprocating movement, so as to achieve a continual feeding of the filament.

Another advantage of the present invention is to provide a handheld 3D drawing arrangement and reciprocating filament moving system and filament moving method thereof, wherein the filament can be driven to move forward synchronously along with at least one forward moving filament moving element of the reciprocating filament moving system, so as to achieve the forward conveying of the filament.

Another advantage of the present invention is to provide a handheld 3D drawing arrangement and reciprocating filament moving system and filament moving method thereof, wherein during each filament moving cycle, a forward moving distance of the filament moving element determines a forward displacement distance of the filament, so that the forward moving distance in each filament moving cycle and a moving speed of the filament moving element can be used to control a feeding speed of the filament.

Another advantage of the present invention is to provide a handheld 3D drawing arrangement and reciprocating filament moving system and filament moving method thereof, wherein the reciprocating filament moving system urges the filament to move forward by means of a frictional contact between the filament moving element and the filament, wherein the reciprocating filament moving system is constructed to produce a frictional pushing force when the filament moving element larger than a frictional force when the filament moving element is moving backward to reset its position, so as to ensure that the filament can be continuously transported forward.

Another advantage of the present invention is to provide a handheld 3D drawing arrangement and reciprocating filament moving system and filament moving method thereof, wherein since the filament moving element can be configured to be kept in elastically contact with the filament, during a filament loading and preparing process of the filament, the filament is allowed to move forward along a feeding pathway until its front end pushes away the filament moving element and move to a position corresponding to a heating system which is beyond the position of the reciprocating filament moving system, so that it is unlike a loading process by the conventional gear driving mechanism or screw driving mechanism in which an additional conveying operation is required to move the front end of the filament from the position corresponding to the gear driving mechanism or the screw driving mechanism to a heating position.

Another advantage of the present invention is to provide a handheld 3D drawing arrangement and reciprocating filament moving system and filament moving method thereof, wherein the filament moving element has a contact with the filament under an elastic pushing force, so that a diameter of the filament is allowed to a have a relatively large tolerance, and thus it is unlike the conventional 3D printing pen that has a relatively strict diameter tolerance for the filament.

Another advantage of the present invention is to provide a handheld 3D drawing arrangement and reciprocating filament moving system and filament moving method thereof, wherein the filament moving element can be separated with the filament so as to facilitate a user to withdraw the filament from the feeding pathway of the handheld 3D drawing arrangement.

Another advantage of the present invention is to provide a handheld 3D drawing arrangement and reciprocating filament moving system and filament moving method thereof, wherein the handheld 3D drawing arrangement is able to achieve the withdrawing of the filament by a mechanical structure, so that a driving motor of the reciprocating filament moving system is not required to be set with different electrode polarities, so that it is unlike the conventional gear driving mechanism or screw driving mechanism that requires to reverse the rotation of a motor to withdraw the filament.

Another advantage of the present invention is to provide a handheld 3D drawing arrangement and reciprocating filament moving system and filament moving method thereof, wherein the handheld 3D drawing arrangement allow the front end of the filament to withdraw out of the feeding pathway directly from the heating position, so that it is convenient to take out the filament, and thus it is unlike the conventional 3D printing pen that requires to wait for the filament to retreat from the heating position to a position completely disengaging with the gear driving mechanism or screw driving mechanism before the filament can be taken out of the feeding pathway.

Another advantage of the present invention is to provide a handheld 3D drawing arrangement and reciprocating filament moving system and filament moving method thereof, wherein the filament moving element has a relatively few contact area with the filament, so that when the handheld 3D drawing arrangement is provided with a dyeing system that is capable of providing dyeing to the filament with multiple colors, the filament moving element is relatively less contaminated with dyes, so that an interference effect when changing dyes for the filament is relatively small.

Another advantage of the present invention is to provide a handheld 3D drawing arrangement and reciprocating filament moving system and filament moving method thereof, wherein the handheld 3D drawing arrangement is further provided with a stopper assembly that is able to apply a force to the filament to prevent the filament to retreat back during the backward resetting process of the filament moving element of the reciprocating filament moving system, so as to ensure that the filament is able to move forward with a predetermined forward displacement during each filament moving cycle.

Another advantage of the present invention is to provide a handheld 3D drawing arrangement and reciprocating filament moving system and filament moving method thereof, wherein the handheld 3D drawing arrangement is simple in structure and convenient to use.

According to one aspect of the present invention, the present invention provides a reciprocating filament moving system of handheld 3D drawing arrangement for heating and melting a solid filament for drawing a 3D object, wherein the handheld 3D drawing arrangement has a feeding pathway, wherein the reciprocating filament moving system comprising a filament moving element which is capable of being driven to reciprocating move to urge the filament to move forward in the feeding pathway.

According to another aspect of the present invention, the present invention provide a handheld 3D drawing arrangement for heating and melting a solid filament for drawing a 3D object, wherein the handheld 3D drawing arrangement comprises:

a main body comprising a handheld housing and having a feeding pathway within the handheld housing;

a reciprocating filament moving system comprising a filament moving element which is capable of being driven to reciprocating move;

a heating system; and a controller, wherein under control of the controller, the reciprocating filament moving system is operated to allow the filament moving element to reciprocating move, so as to drive the filament to be feed to the heating system through the feeding pathway, so that the filament is heated and melted by the heating system for drawing the 3D object.

According to some embodiments, the reciprocating filament moving system comprises a forward movement driving mechanism and a backward movement driving mechanism, wherein during a filament moving cycle, the forward movement driving device is arranged to drive the filament moving element to move forward, the backward movement driving mechanism is arranged to drive the filament moving element to move backward.

According to some embodiments, the reciprocating filament moving system comprises a power source and a driving assembly which periodically drives the filament moving element to move back and forth with energy provided by the power source.

According to some embodiments, the power source comprises a power module, a driving motor and an output shaft, wherein the driving assembly comprises a reciprocation control element and a driving element, wherein the driving motor is powered by an electric energy provided by the power supply module to rotate, and the reciprocation control element is connected to the output shaft, so as to rotate synchronously with the driving motor and to drive the driving element to move back and forth in order to drive the filament moving element to move back and forth.

According to some embodiments, the reciprocation control element comprises a movement control wheel comprising a first driving action surface which is a curved surface, and the driving element comprises a first force bearing surface, wherein when the movement control wheel rotates, the first driving action surface is rotating to act on the corresponding first force bearing surface to drive the driving element to move forward, thereby driving the filament moving element to move forward.

According to some embodiments, the movement control wheel comprises a second driving action surface which is a curved surface, and the first driving action surface and the second driving action surface are located on two opposite sides of the movement control wheel, wherein the driving element comprises a second force bearing surface, wherein when the movement control wheel rotates, the second driving action surface is rotating to act on the corresponding second force bearing surface, and the driving element is driven to move backward so as to drive the filament moving element to move backward.

According to some embodiments, the driving element comprises a driving frame having an engaging groove, and the first force bearing surface and the second force bearing surface are located at two opposite sides of the engaging groove, wherein positions of the first driving action surface and the second driving action surface are driven to periodically rotate into the engagement groove to respectively have contact with the first force bearing surface and the second force bearing surface.

According to some embodiments, each of the first driving action surface and the second driving action surface has at least one peak position, at least one valley position, and at least two transition surfaces between adjacent the peak position and the valley position, wherein the at least one peak position and the at least one valley position of the first driving action surface are respectively aligned with the at least one valley position and the at least one peak position of the second driving action surface at two opposite sides of the movement control wheel.

According to some embodiments, each of said at least two transition surfaces is a parabolic curved surface or a curved surface or an inclined surface.

According to some embodiments, the filament moving element, which is inclinedly arranged with respect to the feeding pathway, has a driving contact surface for having frictional contact with the filament to urge the filament to move forward.

According to some embodiments, the driving element has a fixing groove, wherein the filament moving element is a blade which is installed in the fixing groove and is inclinedly arranged with respect to the feeding pathway, wherein the filament moving element has a driving contact surface for having frictional contact with the filament to drive the filament to move forward.

According to some embodiments, the filament moving element is a flat plate and is integrally formed with the driving frame, wherein the filament moving element, which is inclinedly arranged with respect to the feeding pathway, has a driving contact surface for having frictional contact with the filament to drive the filament to move forward.

According to some embodiments, the reciprocating filament moving system further comprises an elastic limiting element which is biasing against the filament moving element to keep the filament moving element being in contact with the filament.

According to some embodiments, the reciprocating filament moving system further comprises an elastic limiting element which is integrally formed with the driving frame and is biasing against the filament moving element to keep the filament moving element being in contact with the filament.

According to some embodiments, the reciprocating filament moving system further comprises a stopper system for acting on the filament to prevent the filament from moving backward in the feeding pathway.

According to some embodiments, the stopper system comprises a stopper element and a carrier frame located in the main body, wherein the stopper element, which is mounted on the carrier frame or is integrally formed with the carrier frame, comprises a stopper contact surface adapted to have frictional contact with the filament to prevent backward movement of the filament in the feeding pathway.

According to some embodiments, the carrier frame has an assembly groove, wherein the stopper element is a blade which is installed in the assembly groove and is inclinedly arranged with respect to the feeding pathway, wherein the stopper system further comprises an elastic positioning element which is biasing against the stopper element to keep the stopper element being in contact with the filament.

According to some embodiments, the stopper system has a curved channel to prevent the filament from moving backward in the feeding pathway.

According to some embodiments, the handheld 3D drawing arrangement further comprises an unloading system which comprises an unloading switch and an unloading driving assembly, wherein the unloading switch is operated to drive the unloading driving assembly to move, wherein the unloading drive assembly comprises a pusher element which is arranged to act on the filament moving element to separate the filament moving element from the filament, so that the filament is capable of being retreated from the feeding pathway.

According to some embodiments, the handheld 3D drawing arrangement further comprises an unloading system which comprises an unloading switch and an unloading driving assembly, wherein the unloading switch is operated to drive the unloading driving assembly to move, wherein the unloading drive assembly comprises a pusher element which is arranged to act on the filament moving element and the stopper element to separate the filament moving element and the stopper element from the filament, so that the filament is capable of being retreated from the feeding pathway.

According to some embodiments, the main body further comprises an accommodating housing, wherein the reciprocating filament moving system is assembled to the accommodating housing, wherein the accommodating housing has a retaining groove to guide the driving element to slide in the retaining groove.

According to some embodiments, the main body further comprises an accommodating housing having a limiting hole, the reciprocating filament moving system is assembled to the accommodating housing, wherein the driving element comprises a driving retaining end portion which passes through the limiting hole and is subject to move back and forth in the limiting hole.

According to some embodiments, the main body comprises a feeding pipe which defines the feeding pathway, wherein the feeding pipe comprises a first part and a second part which are spaced apart from each other to form a filament moving space, wherein the filament moving element is adapted to act on a part of the filament located in the filament moving space to drive the filament to move forward.

According to another aspect of the present invention, the present invention provides a filament moving method of a handheld 3D drawing arrangement, which urges a solid filament to move forward to a heating position for drawing a 3D object, wherein the method comprise the following step: driving the filament to move forward in a feeding pathway by a filament moving element which moves back and forth and have contact with the filament.

According to some embodiments, the above method comprises the steps of driving the filament moving element to move forward by a forward movement driving mechanism and driving the filament moving element to move back by a backward movement driving mechanism.

According to some embodiments, in the above method, the filament moving element is periodically driven to move back and forth by a driving assembly under the action of energy provided by a power source, so as to drive the filament to move forward.

According to some embodiments, the above method comprises a step of driving a reciprocation control element of the driving component to rotate by a driving motor of the power source, so as to drive the driving element of the driving assembly to rotate, so as to drive the filament moving element to move back and forth by the driving element.

According to some embodiments, in the above method, a first driving action surface and a second driving action surface on two opposite sides of a movement control wheel of the reciprocation control element rotate to have contact with a first force bearing surface and a second force bearing surface of a driving frame of the driving element respectively to drive the filament moving element to move forward and backward.

According to some embodiments, in the above method, the first driving action surface and the second driving action surface are both curved surfaces, and at least one peak position and at least one valley position of the first driving action surface are respectively arranged to align with at least one valley position and the at least one peak position of the second driving action surface at two the opposite sides of the movement control wheel.

According to some embodiments, the above method further comprises a step of allowing the filament to enter the feeding pathway and push away the filament moving element to reach a heating system so as to complete a loading and preparation step of the filament.

According to some embodiments, the above method further comprises a step of preventing the filament from moving backward by a stopper element having a frictional contact with the filament.

According to some embodiments, the above method further comprises a step of activating an unloading system through an unloading switch to separate the filament moving element from the filament to allows a front end of the filament to be taken out of the feeding pathway from a heating system.

According to some embodiments, the above method further comprises a step of keeping a driving contact end of the filament moving element in contact with the filament in an inclined state to drive the filament to move forward.

According to another aspect of the present invention, the present invention provides a method of producing a 3D drawing material by a handheld 3D drawing arrangement which urges a solid filament to move forward and to be heated and melted for drawing a 3D object, wherein the method comprise the following steps:
(a) driving the filament to move forward in a feeding pathway by a filament moving element which moves back and forth and have contact with the filament; and
(b) heating the forward moving filament and discharge a melted filament through a nozzle.

According to another aspect of the present invention, the present invention provides a method of loading and preparing a filament for a handheld 3D drawing arrangement which urges a solid filament to move forward and to be heated and melted for drawing a 3D object, wherein the method comprises the following steps: receiving the filament through a feeding pathway and allowing the filament to push away a filament moving element until a front end of the filament reaches a heating system.

According to another aspect of the present invention, the present invention provides a method of unloading a filament for taking out the filament from a handheld 3D drawing arrangement, wherein the method comprises the following steps:
(A) separating a driving contact surface of a filament moving element from the filament; and
(B) allowing a front end of the filament to retract from a heating system and be removed from a feeding pathway of the handheld 3D drawing arrangement.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 7B and FIG. 7C are respectively schematic views illustrating an alternative mode of a filament moving element of the reciprocating filament moving system of the handheld 3D drawing arrangement according to the above preferred embodiment of the present invention.

FIG. 8A and FIG. 8B are partially enlarged perspective views form different view angles illustrating a reciprocation control element of the reciprocating filament moving system of the handheld 3D drawing arrangement according to the above preferred embodiment of the present invention.

DETAILED DESCRIPTION OF THE PREFERRED EMBODIMENT

Figure 1:
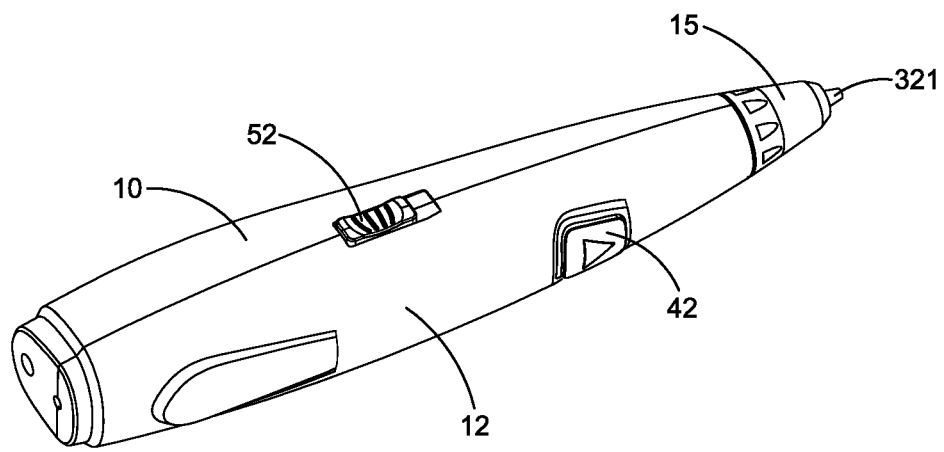
FIG. 1 is a perspective view of a handheld 3D drawing arrangement according to a preferred embodiment of the present invention.
Figure 2:
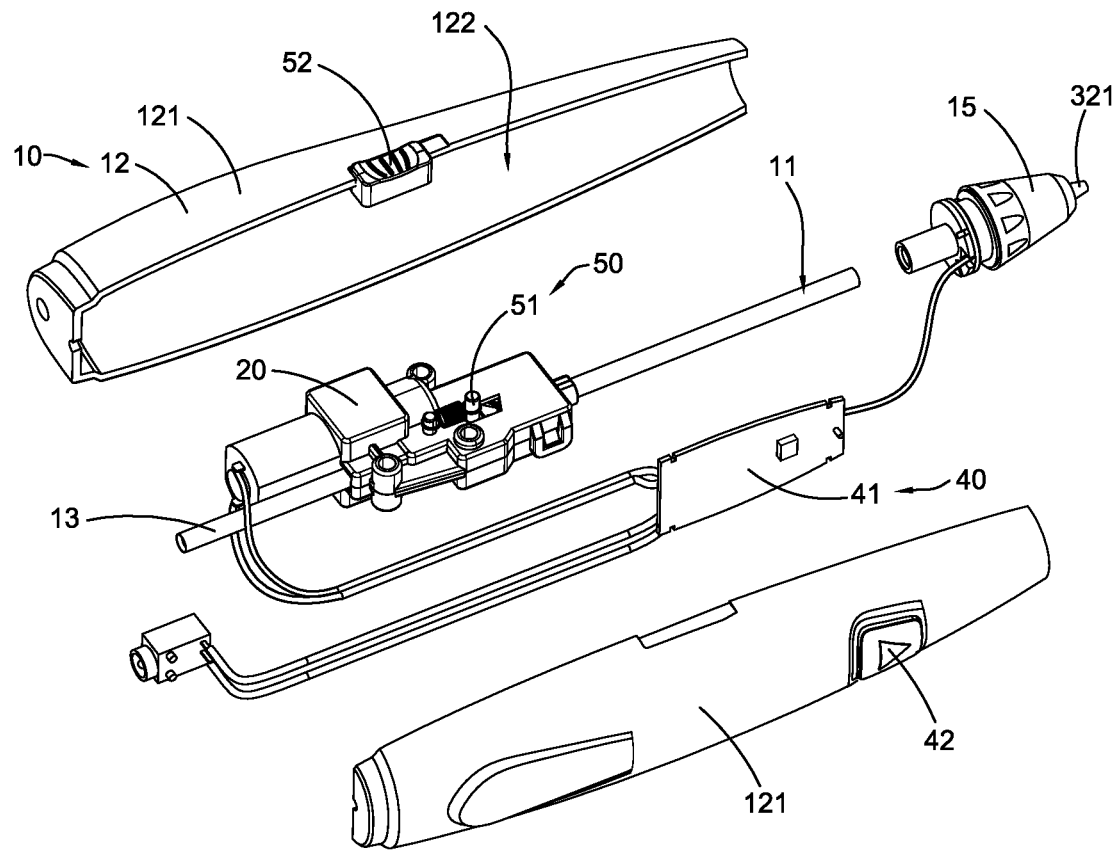
FIG. 2 is an exploded view of the handheld 3D drawing arrangement according to the above preferred embodiment of the present invention.
Figure 3:
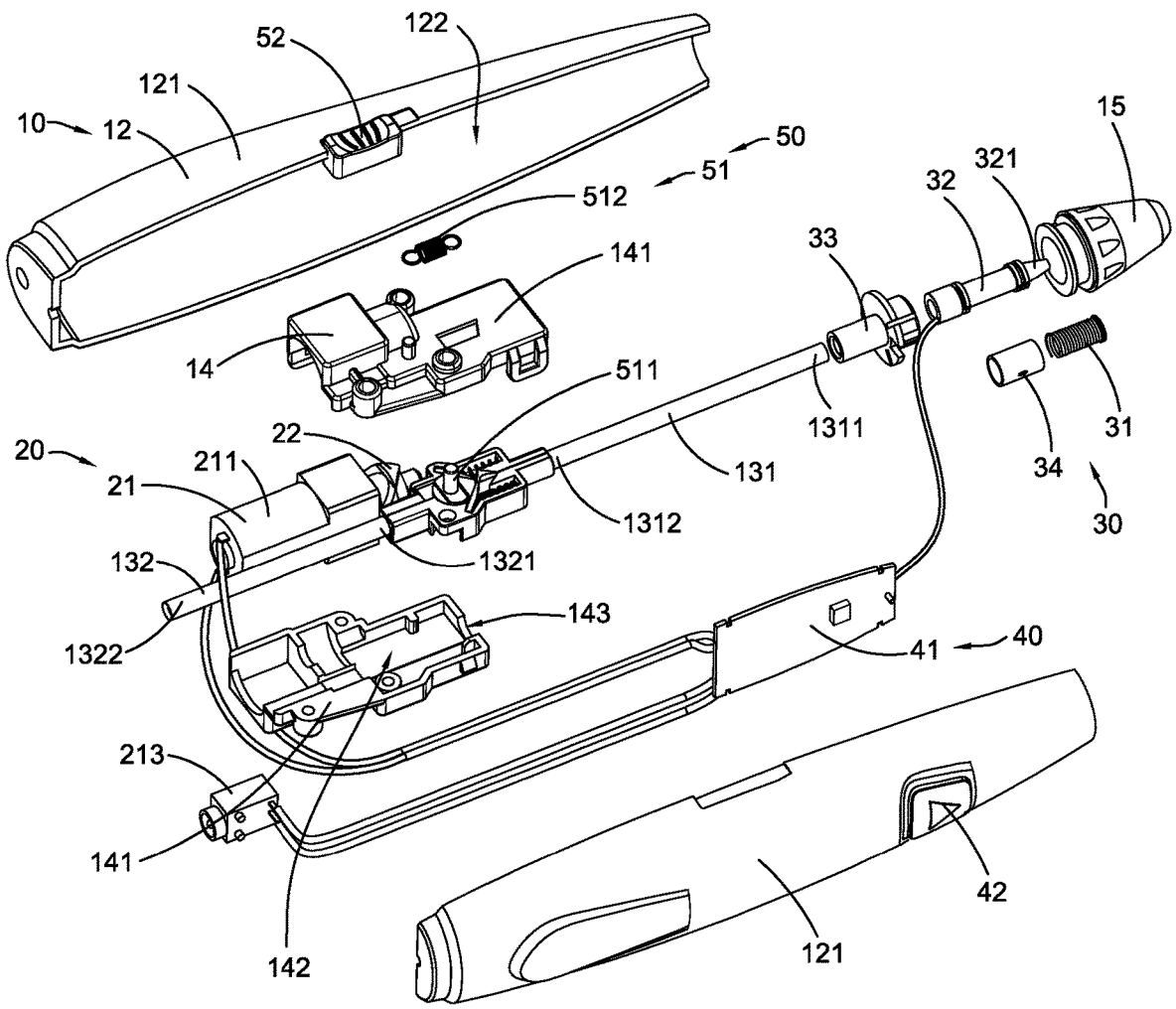
FIG. 3 is a further exploded view of the handheld 3D drawing arrangement according to the above preferred embodiment of the present invention, illustrating the reciprocating filament moving system of the handheld 3D drawing arrangement.
Figure 4:
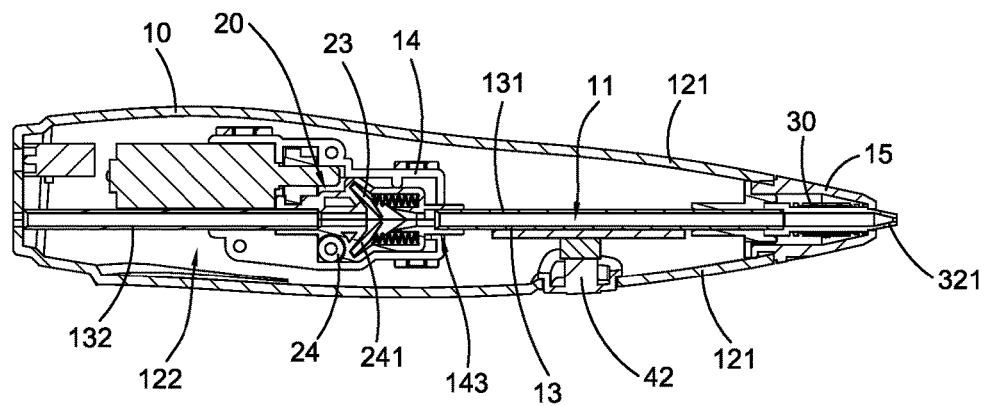
FIG. 4 is a sectional view of the handheld 3D drawing arrangement according to the above preferred embodiment of the present invention.
Figure 5:
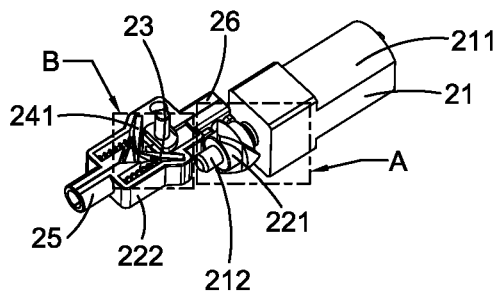
FIG. 5 is a perspective view illustrating the reciprocating filament moving system of the handheld 3D drawing arrangement according to the above preferred embodiment of the present invention.
Figure 6:
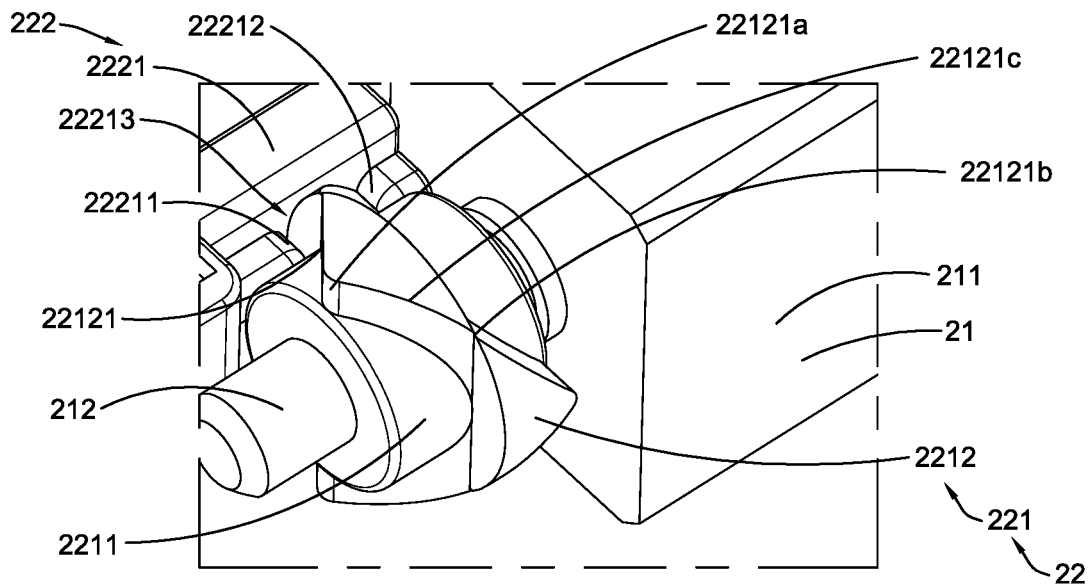
FIG. 6 is a partially enlarged view of area A of FIG. 5.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

It should be understood that the term "a" should be understood as "at least one" or "one or more". In other words, in one embodiment, the number of an element may be one, and in another embodiment, the number of the elements may be plural. The term "one" should not be understood as a limitation on the number.

Referring to FIG. 1 to FIG. 13B of the drawings, a handheld 3D drawing arrangement according to a preferred embodiment of the present invention is illustrated, the handheld 3D drawing arrangement can heat and melt a solid state rod-shaped or strip-shaped filament 1 to form a melted material for 3D drawings works. Specifically, the handheld 3D drawing arrangement comprises a main body 10, a reciprocating filament moving system 20, a heating system 30 and a controller 40. The main body 10 has a feeding pathway 11 for forward feeding the filament 1 and comprises a handheld housing 12 that can be hold by a hand of a user for manual manipulation to draw in three-dimensional space. Typically, an outer appearance of the handheld housing 12 is configured to be pen-shaped, so as to be held and operated by human fingers. The reciprocating filament moving system 20 conveys the filament 1 forward in the feeding pathway 11 of the main body 10 to the heating system 30 under control of the controller 40, and the heating system 30 heats the filament 1 to form the melted material under the control of the controller 40, and the melted material is further extruded from a front end of the main body 10 for completing the 3D drawing works.

The filament 1 is a solid hot-melting material, such as PLA (polylactic acid) material or ABS (acrylonitrile-butadiene-styrene copolymer) material, which is heated and melted by the heating system 30 and is extruded from the front end of the main body and is cooled to form a 3D drawing object.

The feeding pathway 11 may be formed by the handheld housing 12, that is, a space inside the handheld housing 12 forms the feeding pathway 11. In this embodiment of the present invention, the main body 10 comprises a feeding pipe 13 for forming the feeding pathway 11, that is, the feeding pathway 11 is formed by an independent pipe.

More specifically, the feeding pipe 13 is provided in the hand-held housing 12, and comprises a first part 131 at a front side and a second part 132 at a rear side, wherein the first part 131 and the second part 132 are spaced apart from each other to form a filament moving space 133 between the first part of the pipe 131 and the second part of the pipe 132 for exposing the filament 1 in the filament moving space 133 for the reciprocating filament moving mechanism 20 to act on the filament 1 to drive the filament 1 to be conveyed forward in the feeding pipe 13.

A shape and a size of the feeding pathway 11 formed by the feeding pipe 13 are respectively adapted to match with a shape and a size of the filament 1, so as to ensure that the filament 1 moves forward smoothly in the feeding pathway 11. For example, in this preferred embodiment of the present invention, cross-sections of the feeding channel 11 and the filament 1 are both circular.

In the conventional 3D painting pen, the filament 1 is engaged by gears or threads and is driven to move forward by the rotating gears or threads. However, according to the present invention, the filament is conveyed forward in the main body 10 and is transported to the heating system 30 by the reciprocating filament moving system 20.

More specifically, the reciprocating filament moving mechanism 20 comprises a power source 21, a driving assembly 22 and a filament moving element 23, the filament moving element 23 is adapted for in contact with a surface of the filament 1 during a working state, and is moving back and forth with the power source 21 providing energy and the driving assembly 22 driving the filament moving element 23, so as to drive the filament 1 to move forward in the feeding pathway 11 of the main body 10 by a frictional force generated between the filament moving element 23 and the filament 1.

That is to say, the filament moving element 23 can act on the surface of the filament 1 and reciprocate periodically. In a filament moving cycle, when the filament moving element 23 moves forward, the filament 1 moves forward synchronously along with the forward moving element 23, and when the filament moving element 23 moves backward and resets, the filament moving element 23 does not drive the filament 1 to move forward.

The filament moving element 23 does not drive the filament 1 to move forward by rotating, but urges the filament 1 to move forward by a linear movement. It can be understood that, the structure of the filament moving element 23 to achieve reciprocating movement to drive the filament 1 to move forward is not limited to the structure shown in the accompanying drawings of the present invention. For example, in a filament moving cycle, the filament moving element 23 can grasp the filament 1 and move forward for a predetermined distance, and then release the filament 1 and retreat to reset. The filament moving element 23 can be deformed, and can generate a reciprocating displacement in a deformation cycle and drive the filament 1 to move forward.

In this preferred embodiment of the present invention, the power source 21 comprises a driving motor 211, an output shaft 212 and a power module 213, and the power module 213 may comprises a rechargeable battery to provide a power supply to the driving motor 211, or the power module 213 may be adapted to be connected to an external power source to convert the power provided by the external power source into power usable by the handheld 3D drawing arrangement to drive the driving motor 211. The output shaft 212 rotates under the driving action of the driving motor 211.

The driving assembly 22 comprises a reciprocation control element 221 and a driving element 222. The reciprocation control element 221 is connected to the output shaft 212 to generate rotation under the driving action of the output shaft 212. The driving element 222 is coupled to the reciprocation control element 221 to generate a reciprocating movement under the driving action of the reciprocation control element 221, so that the filament moving element 23 synchronizes with the reciprocating movement of the driving element 222 to drive the forward movement of the filament 1.

The reciprocation control element 221 and the driving element 222 convert the rotation output by the output shaft 212 into the linear reciprocating movement of the driving element 222, so that the reciprocating movement of the filament moving element 23 can be realized, so that the moving The forward movement of the filament moving element 23 is used to drive the synchronous forward displacement of the filament 1.

In this preferred embodiment of the present invention, the filament moving element 23 is in the shape of a blade or a flat plate, a contact end 231 at a distal end of the filament moving element 23 has a driving contact surface 230, and a connecting end 232 at its proximal end is connected to the driving element 222. The driving contact surface 230 is adapted to be in contact with the filament 1, so that during the filament moving cycle, the filament 1 is urged to move forward through the forward moving driving contact surface 230 which has a contact with the filament to generate a forward friction force to drive the filament 1 to move forward. When the driving contact surface 230 is reset and moved backward, the filament 1 can be kept in a position that has been displaced forward with a certain distance.

Figure 7A:
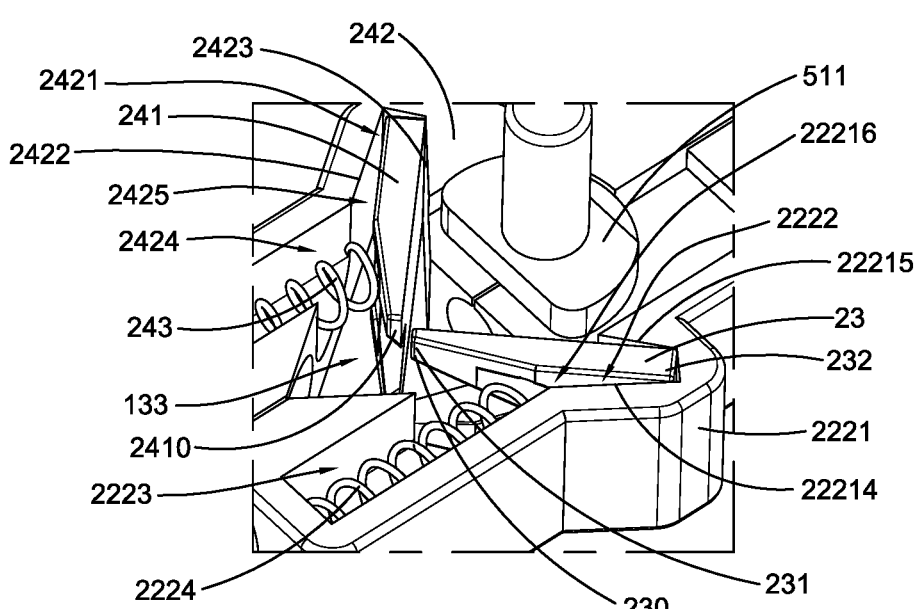
FIG. 7A is a partially enlarged view of area B of FIG. 5.

As shown in FIG. 7A, the driving contact surface 230 may have a V-shaped opening for increasing the contact area with the filament 1. It is also possible, as shown in FIGS. 7B and 7C, which are respectively implemented as a single-sided or double-sided edge.

In the handheld 3D drawing arrangement, the contact end 231 of the filament moving element 23 is inclinedly extended from the driving contact surface 230 which is in contact with the filament 1 toward a direction opposite to the forward direction of the filament 1, and an included angle α, which is an acute angle, is defined between the contact end 231 of the filament moving element 23 and the filament 1. That is, the contact end 231 of the filament moving element 23 is inclinedly disposed, and a frictional force can be generated between the driving contact surface 230 and the surface of the filament 1 for driving the forward movement of the filament 1. It is worth mentioning that, by designing the value of the included angle α, the value of the frictional force generated between the driving contact surface 230 and the surface of the filament 1 can be adjusted.

The reciprocation control element 221 includes a connecting component 2211 and a movement control wheel 2212, the connecting component 2211 is mounted on the output shaft 212 of the power source 21, the movement control wheel 2212, which is provided on a surface of the connecting component 2211, is adapted to be driven by the driving motor 211 to rotate synchronously with the rotation of the output shaft 212. The movement control wheel 2212 may be integrally formed with the connecting component 2211, or the movement control wheel 2212 may be mounted to the connecting component 2211.

The movement control wheel 2212 comprises a first driving action surface 22121 extending in a circumferential direction on its front side for driving the driving element 222 to move forward, the front side of the movement control wheel 2212 is a side facing the front end of the handheld 3D drawing arrangement. In the filament moving cycle, the filament moving element 23 can be driven by the driving element 222 to urge the filament 1 to move forward. Then, the filament moving element 23 returns to the original reset position under the action of a reset structure to complete one filament moving cycle.

Figure 9:
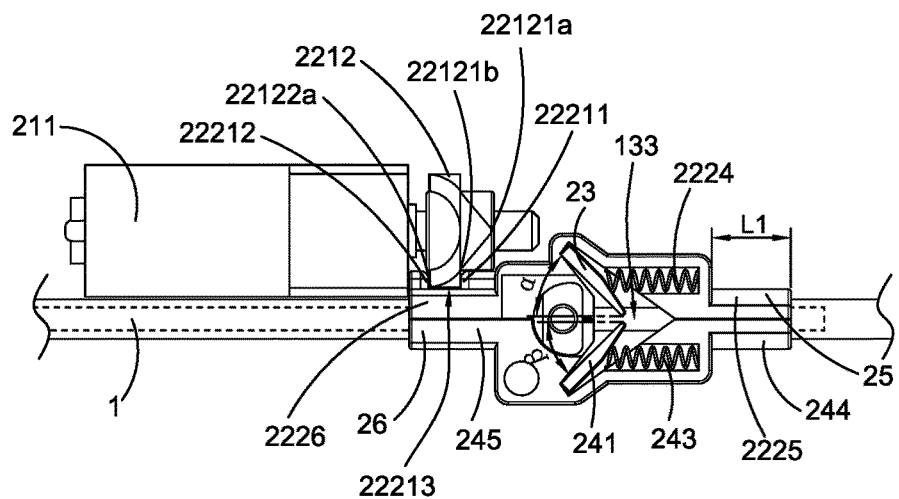
FIG. 9 is a schematic view illustrating the handheld 3D drawing arrangement being in an initial operation state according to the above preferred embodiment of the present invention.
Figure 10:
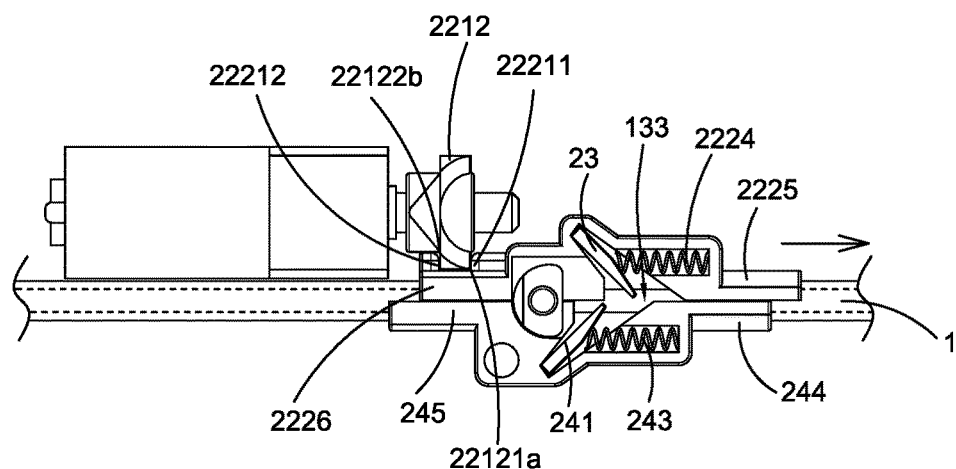
FIG. 10 is a schematic view illustrating the forward moving filament moving element of the reciprocating filament moving system of the handheld 3D drawing arrangement for urging the filament to move forward according to the above preferred embodiment of the present invention.
Figure 11:
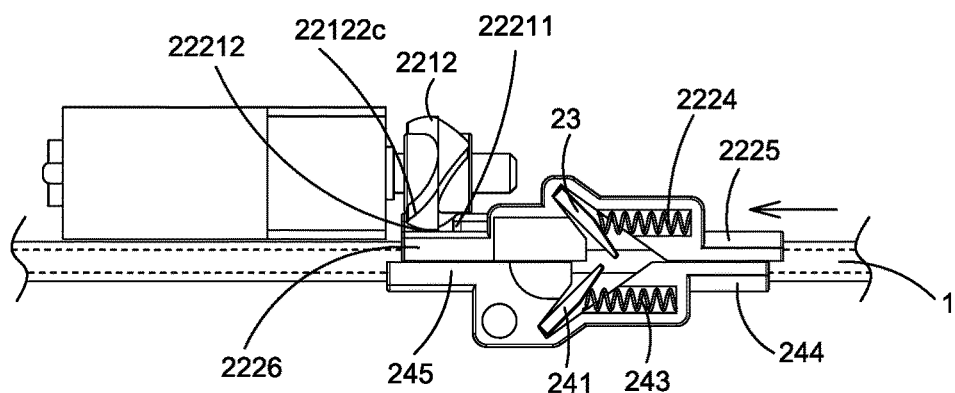
FIG. 11 is a schematic view illustrating the backward moving filament moving element of the reciprocating filament moving system of the handheld 3D drawing arrangement for resetting the filament moving element to its initial operation state according to the above preferred embodiment of the present invention.
Figure 12A:
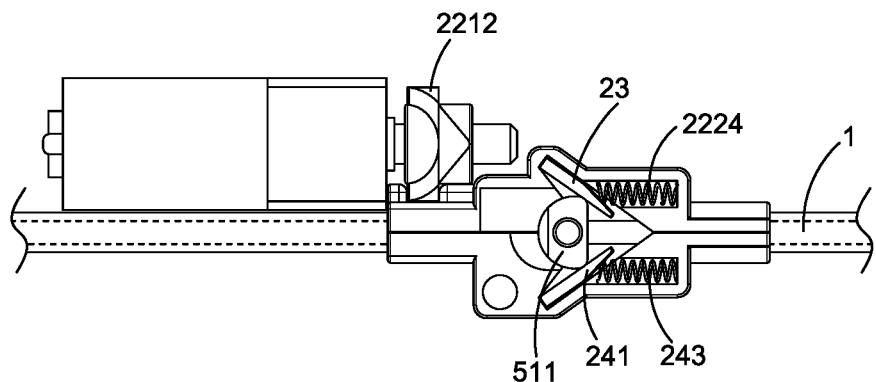
FIG. 12A and FIG. 12B are respectively sectional views illustrating an filament withdrawing process by a filament withdrawing system of the handheld 3D drawing arrangement according to the above preferred embodiment of the present invention.
Figure 12B:
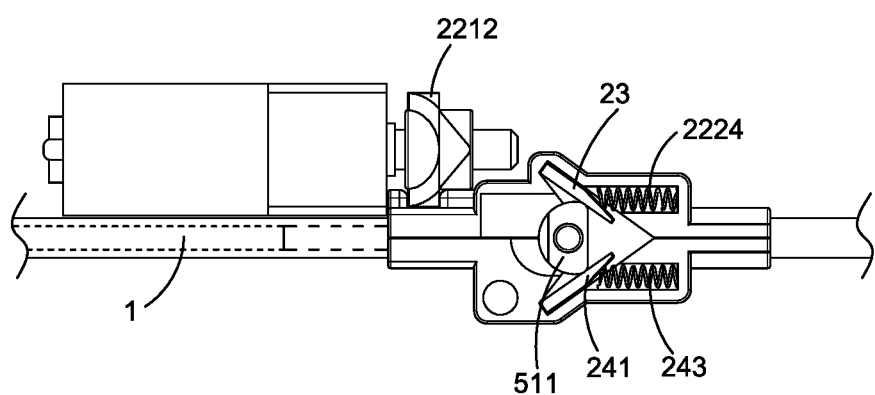
Figure 13A:
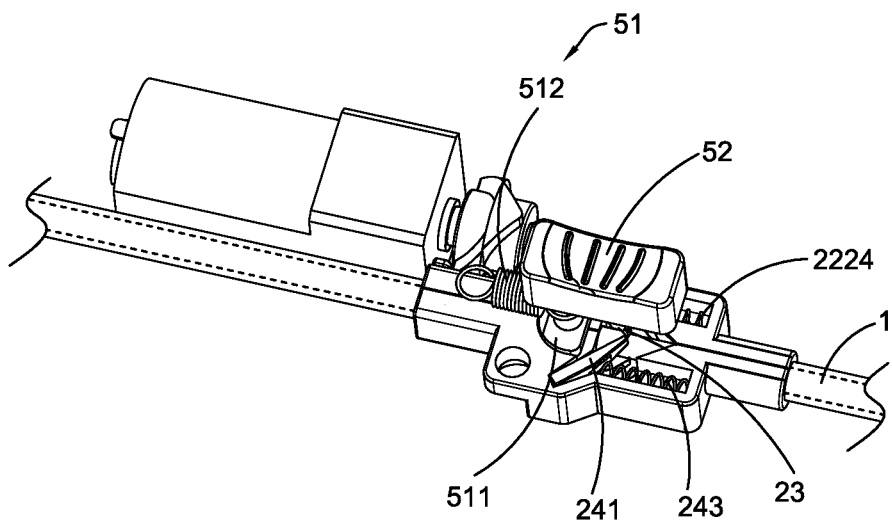
FIG. 13A and FIG. 13B are respectively perspective views illustrating the filament withdrawing process by the filament withdrawing system of the handheld 3D drawing arrangement according to the above preferred embodiment of the present invention.
Figure 13B:
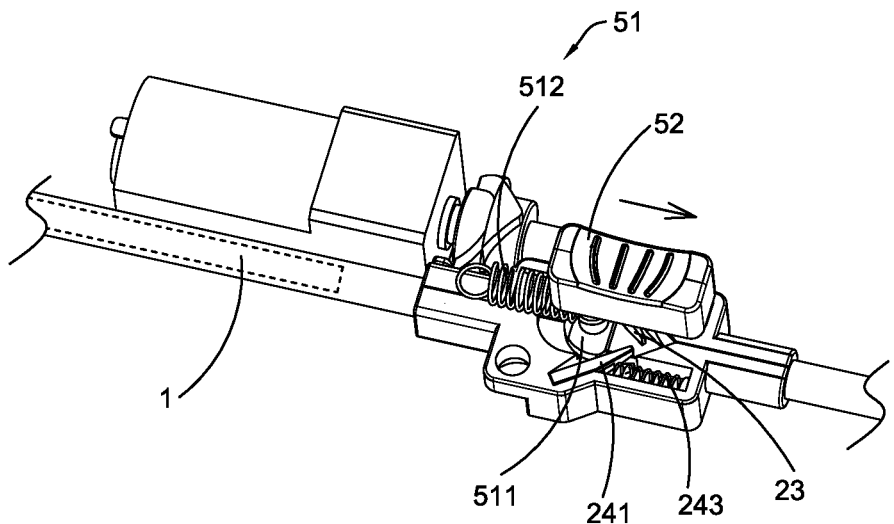
Figure 14:
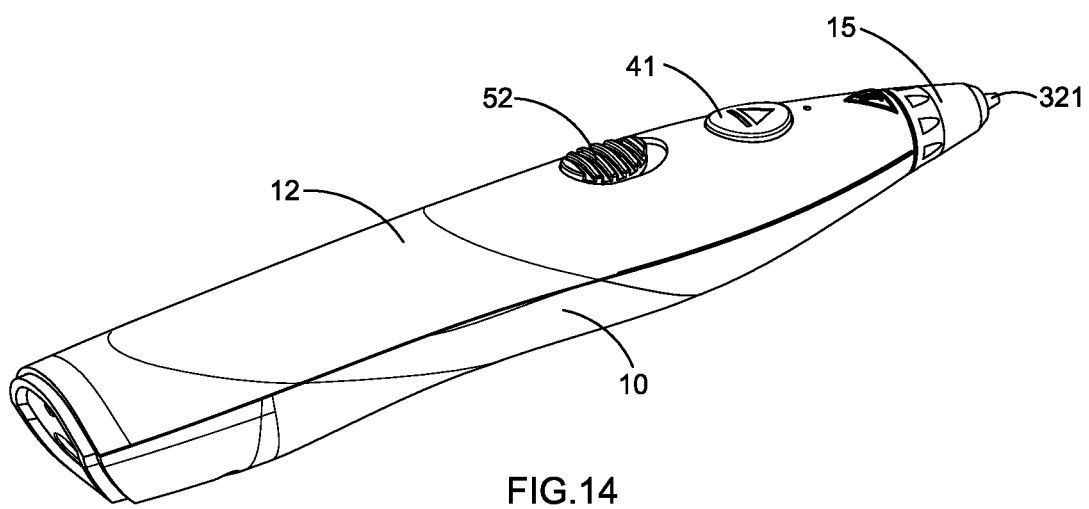
FIG. 14 is a perspective view of the handheld 3D drawing arrangement according to a first alternative mode of the above preferred embodiment of the present invention.
Figure 15:
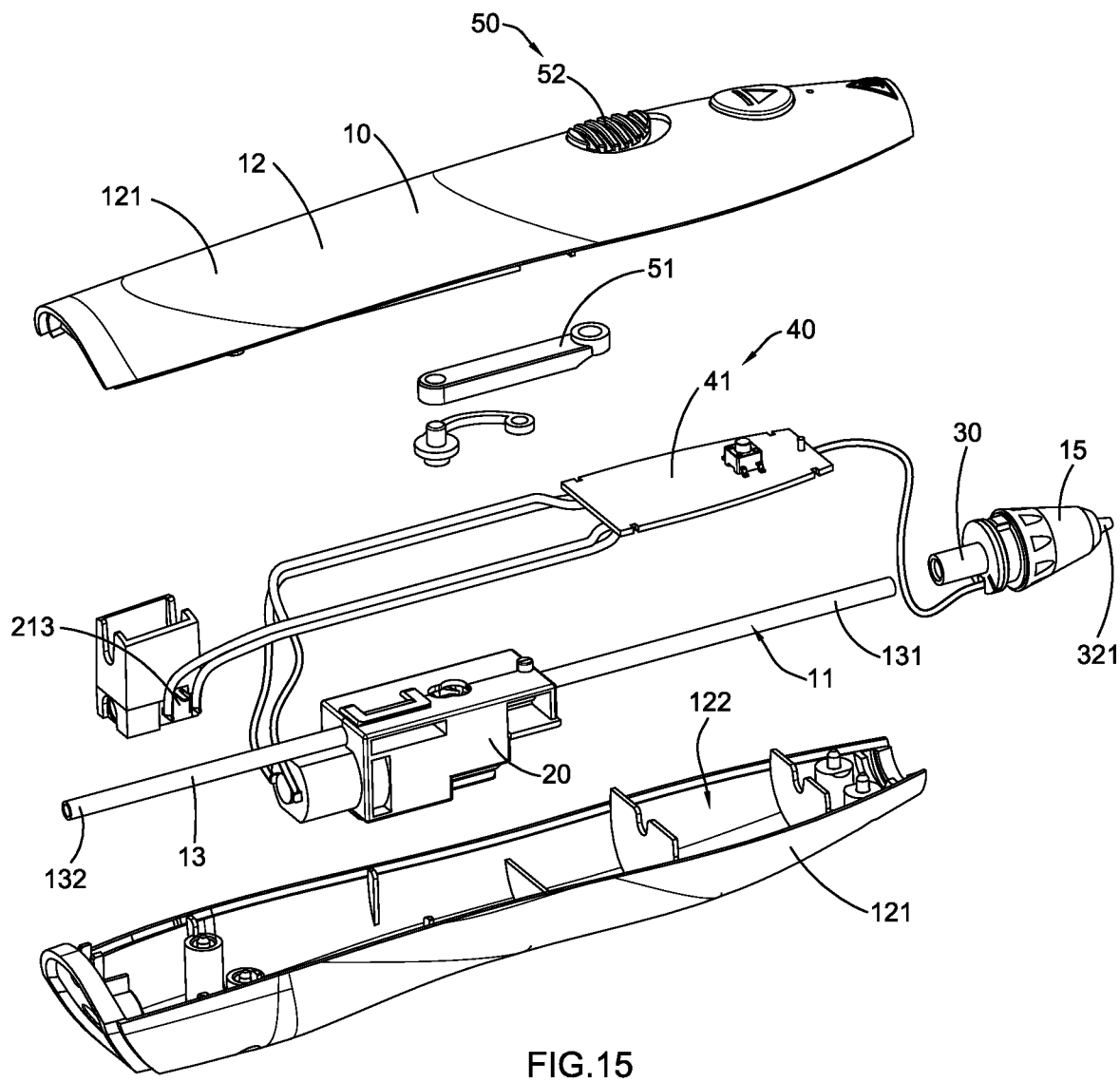
FIG. 15 is an exploded view of the handheld 3D drawing arrangement according to the first alternative mode of the above preferred embodiment of the present invention.
Figure 16:
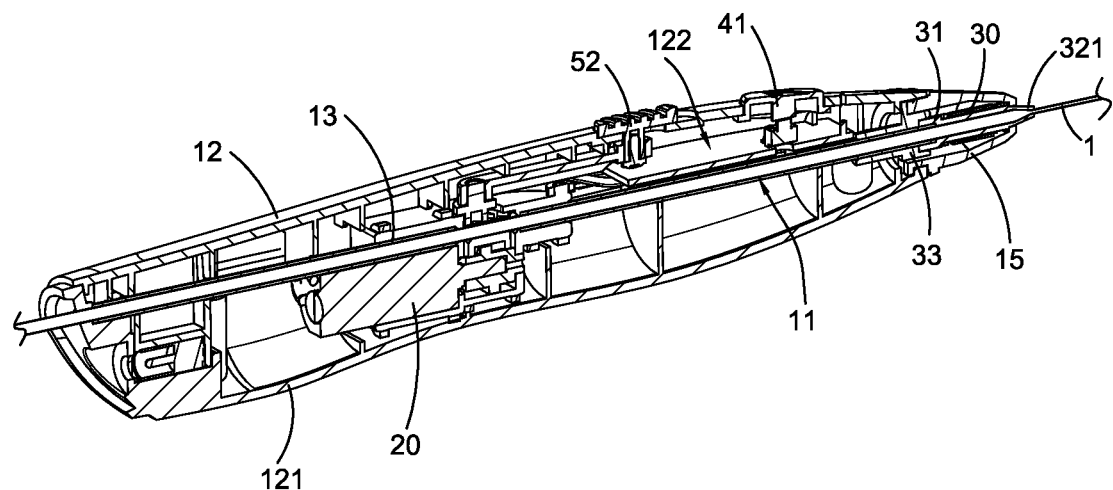
FIG. 16 is a sectional view of the handheld 3D drawing arrangement according to the first alternative mode of the above preferred embodiment of the present invention.
Figure 17:
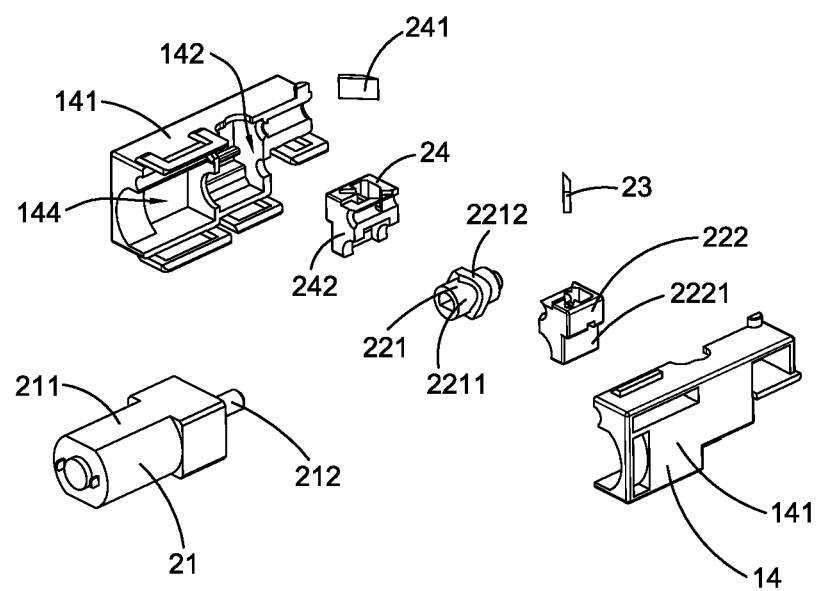
FIG. 17 and FIG. 18 are respectively exploded views illustrating the reciprocating filament moving system of the handheld 3D drawing arrangement according to the first alternative mode of the above preferred embodiment of the present invention.
Figure 18:
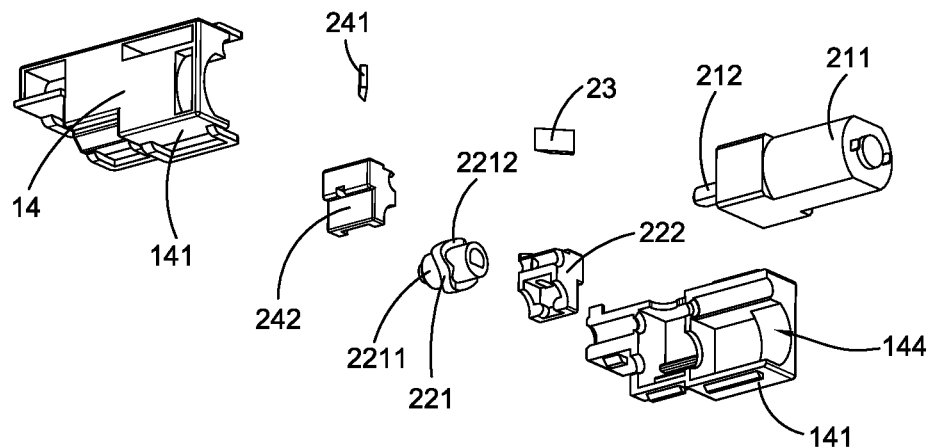
Figure 19A:
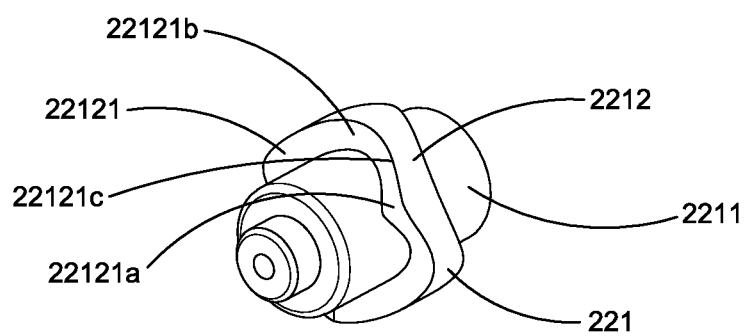
FIG. 19A and FIG. 19B are respectively perspective views from different view angles illustrating the reciprocation control element of the reciprocating filament moving system of the handheld 3D drawing arrangement according to the first alternative mode of the above preferred embodiment of the present invention.
Figure 19B:
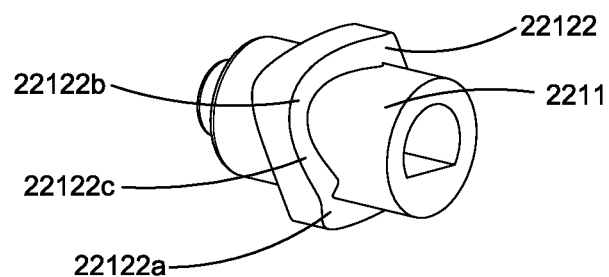
Figure 20:
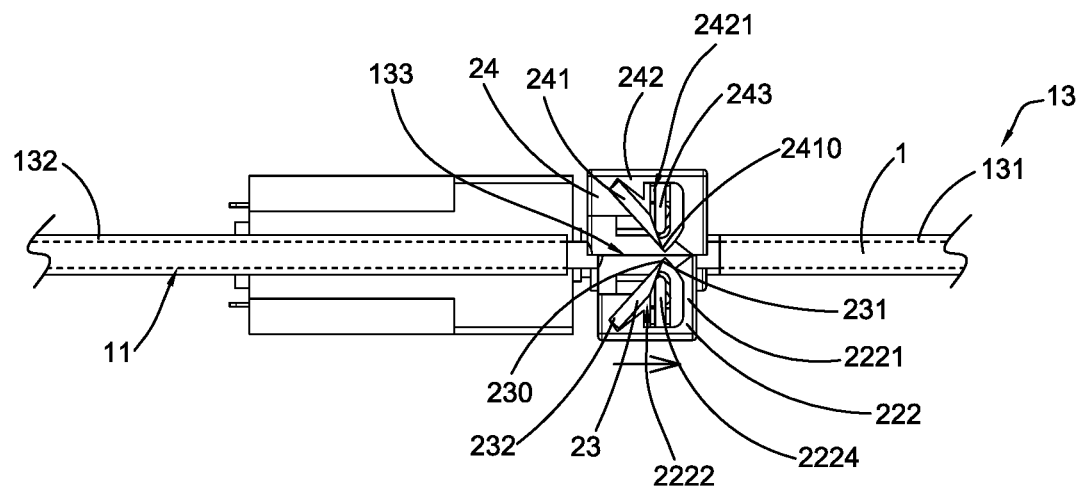
FIGS. 20, 21, 22 and 23 are respectively schematic views illustrating the filament moving element of the reciprocating filament moving system of the handheld 3D drawing arrangement that is forward moving for urging the filament to move forward according to the first alternative mode of the above preferred embodiment of the present invention.
Figure 21:
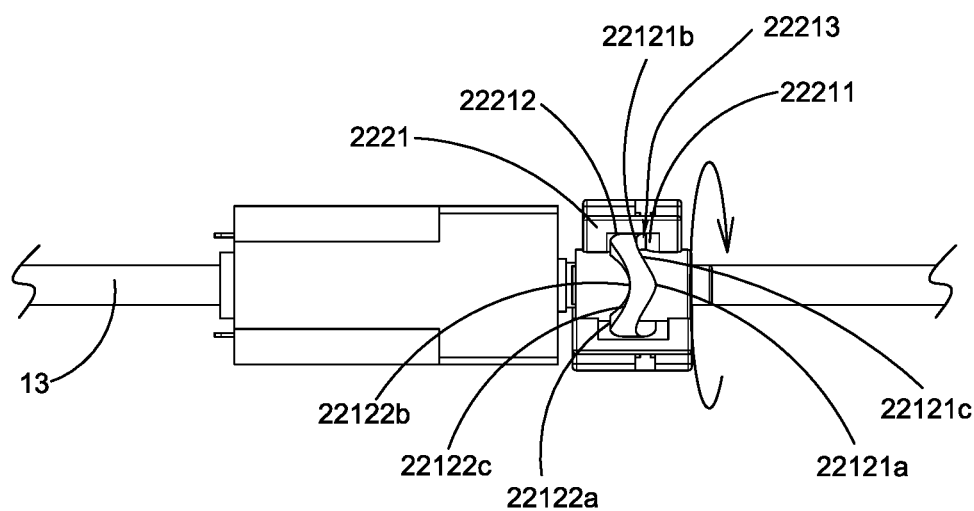
Figure 22:
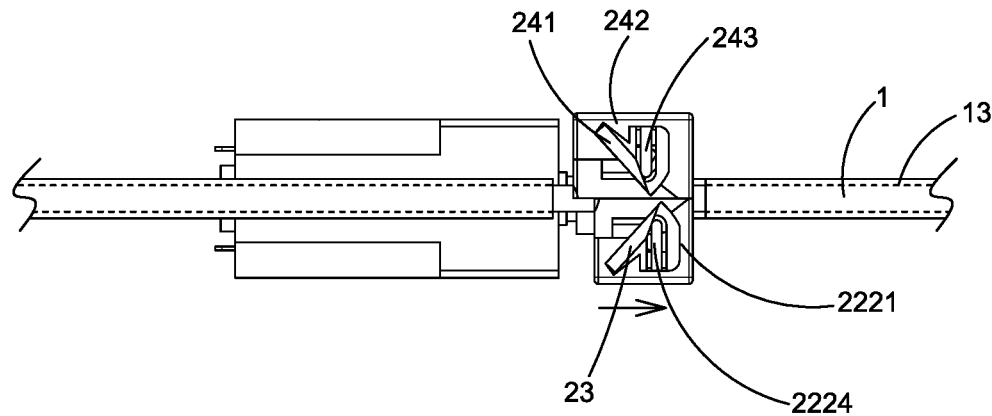
Figure 23:
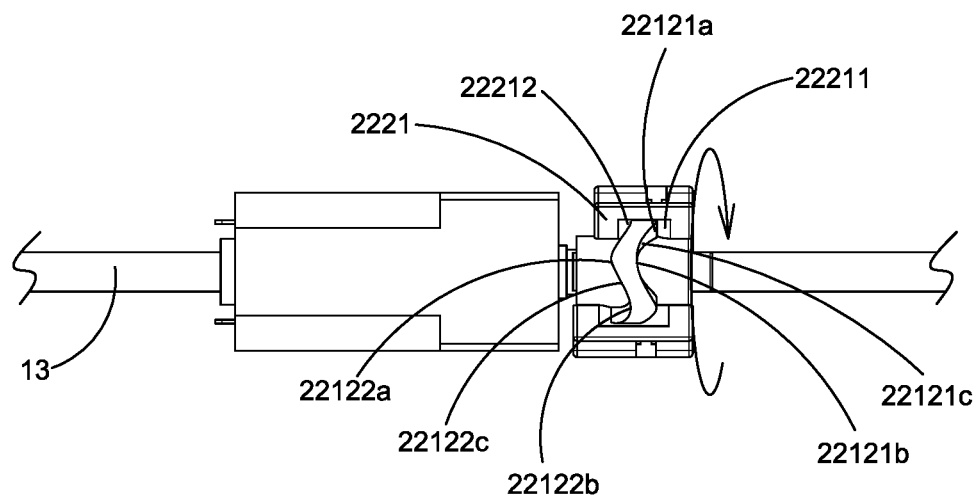

Referring to FIGS. 9 to 11 of the drawings, in this preferred embodiment of the present invention, the movement control wheel 2212 is a wheel that controls directions of reciprocating movements, that is, it can be used to control the forward and backward movements of the filament moving element 23. In other words, the movement control wheel 2212 is also used as the reset structure to reset the driving element 222 and the filament moving element 23. More specifically, the movement control wheel 2212 comprises a second driving action surface 22122 extending in a circumferential direction on a rear side opposite to the front side. Both the first driving action surface 22121 and the second driving action surface 22122 are curved surfaces for contacting with the driving element 222 and driving the driving element 222 to reciprocate.

The driving element 222 includes a driving frame 2221, and the filament moving element 23 is disposed on the driving frame 222. The driving frame 2221 comprise a first force bearing surface 22211 at a position corresponding to the first driving action surface 22121, and a second force bearing surface 22212 at a position corresponding to the second driving action surface 22122. There is an engaging groove 22213 between the first force bearing surface 22211 and the second force bearing surface 22212, and a part of the movement control wheel 2212 extends into the engaging groove 22213, so that each of the first driving action surface 22121 and the second driving action surface 22122 has a part of a curved surface extending into the engaging groove 22213. When the movement control wheel 2212 rotates, the first driving action surface 22121 and the second driving action surface 22122 rotate respectively to allow each position on the circumference of the curved surfaces periodically pass through the engaging groove 22213, so as to drive the reciprocating movement of the driving frame 2221.

The first driving action surface 22121 comprises at least one first peak position 22121a along the circumferential direction, at least one first valley position 22121b, and at least two first transition surfaces extended between the adjacent first peak position 22121a and the first valley position 22121b, each of the first transition surfaces 22121c is an inclined surface, an arc surface or a curved surface. When the first peak position 22121a of the first driving action surface 22121 is in contact with the first force bearing surface 22211, the driving frame 2221 is located at a position of a maximum forward displacement. When the first valley position 22121b of the first driving action surface 22121 is in contact with the first force bearing surface 22211, the driving frame 2221 is in a reset position.

In a stage of driving the filament 1 to move forward in the filament moving cycle, the first valley position 22121b of the first driving action surface 22121 is located in the engaging groove 22213 and is in contact with the first force bearing surface 22211 first, and one of the first transition surfaces 22121c of the first driving action surface 22121 gradually rotates into the engaging groove 22213 and contacts the first force bearing surface 22211 until the first peak position 22121a of the first driving surface 22211 enters the engaging groove 22213 and contacts the first force bearing surface 22211, the movement control wheel 2212 drives the driving element 222 to move to further drive the filament moving element 23 to reach a maximum displacement in a forward direction.

In a reset phase of the filament moving cycle, the driving element 222 is subjected to a reset action, and the position where the first driving action surface 22121 contacts the first force bearing surface 22211 starts from the first peak position 22121a and gradually changes to the first valley position 22121b along one of the first transition surfaces 22121c, the filament moving element 23 returns to its initial position as the driving element 222 moves backward.

The second driving action surface 22122 comprise at least one second peak position 22122a along a circumferential direction, at least one second valley position 22122b, and at least two second transition surfaces 22122c extended between the adjacent second peak position 22122a and the second valley position 22122b, each of the second transition surfaces 22122c is an inclined surface, an arc surface, or a curved surface. When the second valley position 22122b of the second driving action surface 22122 is in contact with the second force bearing surface 22212, the driving frame 2221 is located at a position of a maximum forward displacement. When the second peak position 22122a of the second driving action surface 22122 is in contact with the second force bearing surface 22212, the driving frame 2221 is in a reset position.

It is worth mentioning that, each of the first transition surfaces 23213 and the second transition surfaces 23223 is preferably a parabolic curved surface after being unfolded, so that the movement control wheel 2212 drives the corresponding driving frame 2221 to move to generate a constant acceleration motion, so that compared with the uniform motion of the driving frame 2221 when each of the first transition surfaces 23213 and the second transition surfaces 23223 is an inclined straight surface, the constant acceleration motion can be more conducive to avoid rigid impact and has the advantages of a relatively small starting torque and a relatively large load.

In a stage of driving the filament 1 forward in the filament moving cycle, the driving element 222 is moved forward by the action of the first driving action surface 22121, and the contact position between the second driving action surface 22122 and the second force bearing surface 22122 starts from the second peak position 22122a and gradually changes from the second peak position 22122a to the second valley position 22122b along one of the second transition surfaces 22122c.

In a reset stage of the filament moving cycle, the second valley position 22122b of the second driving action surface 22122 is located in the engaging groove 22213 and is in contact with the second force bearing surface 22212 first. And then one of the second transition surfaces 22122c of the second driving action surface 22122 gradually rotates into the engaging groove 22213 and contacts the second force bearing surface 22212 until the second peak position 22122a of the second driving action surface 22122 is in contact with the second force bearing surface 22212, the movement control wheel 2212 drives the driving element 222 to move backward, so as to further drive the moving element 23 to follow the driving element 222 to move back to its original position.

That is to say, in this preferred embodiment of the present invention, the first driving action surface 22121 and the second driving action surface 22122 on opposite sides of the movement control wheel 2212 act on the first force bearing surface 22211 and the second force bearing surface 22212 respectively to drive the driving element 222 to move forward and backward, so that the filament moving element 23 is further driven by the driving element 222 to move to realize the reciprocating movement of the filament moving element 23.

The first peak position 22121a of the first driving action surface 22121 and the second valley position 22122b of the second driving action surface 22122 are respectively located on corresponding opposite sides of the movement control wheel 2212, the first valley position 22121b of the first driving action surface 22121 and the second peak position 22122a of the second driving action surface 22122 are located on corresponding opposite sides of the movement control wheel 2212 respectively.

When the position of the first driving action surface 22121 rotating into the engaging groove 22213 gradually changes from the first valley position 22121*b* to the first peak position 22121*a*, the position of the second driving action surface 22121 rotating into the engaging groove 22213 gradually changes from the second peak position 22122*a* to the second valley position 22122*b*, and the rotation of the first driving action surface 22121 drives the forward displacement of the driving element 222 to achieve the forward displacement of the filament moving element 23, so that the filament moving element 23 drives the filament 1 to move forward for a predetermined distance.

When the position where the first driving surface 22121 rotating into the engaging groove 22213 gradually changes from the first peak position 22121*a* to the first valley position 22121*b*, the position of the second driving surface 22122 rotating into the engaging groove 22213 gradually changes from the second valley position 22122*b* to the second peak position 22122*a*, and the rotation of the second driving action surface 22122 drives the rearward displacement of the driving element 222 to achieve the rearward displacement of the filament moving element 23 causes the filament moving element 23 to return to its reset position.

In this preferred embodiment of the present invention, the driving element 222 has a fixing groove 2222 inclinedly extended at an inner side of the driving frame 2221 for fixing the filament moving element 23. The inner side of the drive frame 2221 has a front limiting surface 22214 in front of the filament moving element 23, and a rear limiting surface 22215 at a rear side of the filament moving element 23. The fixing groove 2222 is formed between the front limiting surface 22214 and the rear limiting surface 22215, the rear limiting surface 22215 inclinedly supports the filament moving element 23. It can be understood that the filament moving element 23 is illustrated as a blade in this embodiment, and is mounted on the driving element 222. In other embodiments, it can also be implemented as a flat plate integrally formed with the driving element 222.

It can be understood that, in each filament moving cycle, a distance of the filament moving element 23 moving forward determines a forward displacement distance of the filament 1, so that the displacement distance and the moving speed of the filament moving element 23 moving forward in each cycle can be used to control the feeding speed of the filament 1. The distance between the first peak position 22121*a* and the first valley position 22121*b* of the first driving action surface 22121 determines the distance that the moving element 23 is displaced forward, and a rotation speed of the driving motor 211 determines the rotational speed of the movement control wheel 2212, thereby determining the moving speed of the driving element 222 to further determine the moving speed of the filament moving element 23. Therefore, the distance between the first peak position 22121*a* and the first valley position 22121*b* of the first driving action surface 22121 and the rotation speed of the driving motor 211 can be controlled to control the feeding speed of the filament 1.

The driving element 222 also has an installation groove 2223 inside the driving frame 2221, and the driving element 222 further comprises an elastic limiting element 2224 which is connected to the driving frame 2221 and installed in the installation groove 2223. One end of the elastic limiting element 2224 is connected to the driving frame 2221, and the other end thereof is biasing against the filament moving element 23, so that the filament moving element 23 is kept in an inclined state during working, so that the driving contact surface 230 of the contact end 231 of the filament moving element 23 is kept in contact with the filament 1 to drive the filament 1 to move forward through the frictional force.

The elastic limiting element 2224, which may be made of a material with an elastic recovery property, can be embodied as a spring, a torsion spring, an elastic metal, an elastic rubber and the like. In the embodiment shown in FIGS. 1 to 13B, the elastic limiting element 2224 is a spring. It can be understood that, in other alternative modes, the elastic limiting element 2224 can also be integrally formed with the driving frame 2221, that is, the driving frame 2221 itself has elasticity, and a part of it forms the elastic limiting element 2224.

It is worth mentioning that the manner in which the elastic limiting element 2224 keeps the filament moving element 23 be urging against the filament 1 can allow a diameter of the filament to have a relatively large tolerance. That is, the filament moving element 23 can act on the filament 1 with different tolerance diameters. However, when the conventional 3D drawing pen engages with and drives the filament 1 through gears or threads, only the filament 1 of a predetermined size can be inserted into the gears or threads, and the diameter tolerance of the filament 1 of the conventional 3D drawing pen is relatively strict.

In addition, in this embodiment of the present invention, the reciprocating filament moving system 20 drives the filament 1 to move forward through the frictional force generated between the filament moving element 23 and the filament 11, and the filament moving element 23 is inclinedly extended to allow the driving contact surface 230 of the contact end 231 to bias against the filament 1, so that the frictional force on the filament 1 when it moves forward is greater than the frictional force on the filament 1 when it moves back to reset, thereby ensuring that the filament 1 can be continuously moved forward.

In this embodiment, the reciprocating filament moving mechanism 20 further comprises a stopper assembly 24 for preventing the backward movement of the filament 1. More specifically, the stopper assembly 24 comprises a stopper element 241 and a carrier frame 242. The stopper element 241, which may have the same structure as the filament moving element 23, comprises a stopper contact surface 2410 which is adapted for having contact with the filament to prevent the retracting action of the filament 1.

Similarly, an assembly groove 2421 is formed at an inner side of the carrier frame 242 and is inclinedly extended to fix the stopper element 241. The angle between the stopper element 241 and the feeding pathway 11 is an acute angle β. The inner side of the carrier 242 has a front limit surface 2422 in front of the stopper element 241, and a rear limit surface 2423 on a back side of the stopper element 241, and the assembly groove 2421 is formed between the front limit surface 2422 and the rear limit surface 2423, the rear limit surface 2423 inclinedly supports the stopper element 241. Similarly, it will be appreciated that the stopper element 241 is illustrated in this embodiment as a blade and is mounted to the carrier frame 242. In other embodiments, it can also be implemented as a flat plate integrally formed with the carrier frame 242.

An installing groove 2424 is also formed at the inner side of the carrier frame 242, and the stopper assembly 24 further comprises an elastic positioning element 243 which is connected to the carrier frame 242 and installed in the installing groove 2424. One end of the elastic positioning element 243 is connected to the carrier frame 242, and the other end thereof is biasing against the stopper element 241, so that the stopper element 241 is kept in an inclined state during working and the stopper contact surface 2410 of the stopper element 241 is kept in frictional contact with the filament 1 to prevent the filament 1 from moving backward.

Similarly, the elastic positioning element 243, which may be made of a material with an elastic recovery property, can be embodied as a spring, a torsion spring, an elastic metal, an elastic rubber and the like. In the embodiment shown in FIGS. 1 to 13B, the elastic positioning element 243 is a spring. It can be understood that, in other alternative modes, the elastic positioning element 243 can also be integrally formed with the carrier frame 242, that is, the carrier frame 242 itself has elasticity, and a part of it forms the elastic positioning element 243.

It can be understood that, during the forward movement of the filament moving cycle, the driving element 222 of the reciprocating filament moving system 20 drives the filament moving element 23 to move forward, and a driving frictional force between the filament moving element 23 and the filament 1 is greater than the stopping frictional force generated between the stopper element 241 of the stopper assembly 24 and the surface of the filament 1, thereby ensuring that the filament 1 can be driven to synchronously move forward along with the movement of the filament moving element 23.

The handheld housing 12 comprises two part of housings 121 which are assembled with each other to form the handheld housing 12, and an inner cavity 122 is formed therein for accommodating the feeding pipe 13, the reciprocating filament moving system 20, the heating system 30 and the controller 40.

The main body 10 further comprises an accommodating housing 14 installed in the handheld casing 12 for installing the reciprocating filament moving system 20. The driving element 222 is movable with respect to the accommodating housing 14, and the carrier frame 242 of the stopper assembly 24 is fixedly mounted to the accommodating housing 14. In this embodiment, the accommodating housing 14 comprises two parts of housing 141 which are assembled with each other to form the accommodating housing 14 and form an accommodating cavity 142. The filament moving space 133 and the filament moving element 23 are located in the accommodating cavity 142 of the accommodating housing 14.

The accommodating housing 14 may be provided with a guiding structure for guiding the movement of the driving element 222, so as to facilitate guiding and restricting of the movement of the driving element 222, for example, the accommodating housing 14 and the driving element 222 may be provided with corresponding guide rails and guide grooves for guiding the movement of the driving element 222. Optionally, the stopper assembly 24 may be provided with a guiding structure for guiding the movement of the driving element 222, so as to facilitate guiding and restricting of the movement of the driving element 222, such as the stopper assembly 24 and the driving element 222 can be provided with corresponding guide rails and guide grooves to guide the movement of the driving element 222.

In this embodiment of the present invention, a limiting hole 143 is formed at a front end of the housing case 14, and the driving element 222 comprises a front driving retaining end portion 2225 and a rear driving retaining end portion 2226 extending on opposite sides of the driving frame 2221 respectively, the stopper assembly 24 comprises a front stopper retaining end portion 244 and a rear stopper retaining end portion 245 extended from the carrier frame 242 respectively.

The front driving retaining end portion 2225 of the driving element 222 and the front stopper retaining end portion 244 of the stopper assembly 24 cooperate to form a front engaging pipe 25 for communicating with the a rear end portion 1312 of the first part 131 of the feeding pipe 13. For example, in this embodiment, the front engaging pipe 25 is sleeved on an outer surface of the rear end portion 1312 of the first part 131 of the feeding pipe 13. It can be understood that the front engaging pipe 25 can also be sleeved with an inner surface of the rear end portion 1312 of the first part 131 of the feeding pipe 13.

The rear driving retaining end portion 2226 of the driving element 222 and the rear stopper retaining end portion 245 of the stopper assembly 24 cooperate to form a rear engaging tube 26 for communicating with a front end portion 1321 of the second part 132 of the feeding pipe 13. For example, in this embodiment, the rear engaging pipe 26 is sleeved on an outer surface of the front end portion 1321 of the second part 132 of the feeding pipe 13. It can be understood that the rear engaging pipe 26 can also be sleeved with an inner surface of the front end portion 1321 of the second part 132 of the feeding pipe 13.

In this embodiment of the present invention, the front engaging duct 25 passes through the limiting hole 143 at the front end of the accommodating housing 14, so that the limiting hole 143 limits the movement of the front driving retaining end portion 2225 of the driving element 222 to prevent it from swinging unnecessarily. More specifically, the driving element 222 moves back and forth under the rotation of the movement control wheel 2212, and the front driving retaining end portion 2225 of the driving element 222 passes through the limiting hole 143 and slides along a surface of the front stopper retaining end portion 244 of the stopper assembly 24.

It can be understood that premising a length of the front driving retaining end portion 2225 of the driving element 222 is L1, a distance between the first peak position 22121a and the first valley point of the first driving action surface 22121b is L2, then L1 is greater than L2, so that when the driving element 222 drives the filament moving element 23 to slide, the sliding distance will not cause the front driving retaining end portion 2225 of the driving element 222 to be separated from the limiting hole 143 of the accommodating housing 14.

The main body 10 further comprises a head housing 15 for accommodating the heating system 30 which comprises a heating element 31, a heating pipe 32 and a connecting pipe 33, the connecting pipe 33 connects a front end portion 1311 of the first part 131 of the feeding pipe 13 to the heating pipe 32, a rear end portion 1322 of the second part 132 of the feeding pipe 13 is connected to the handheld housing 12. In this way, the filament 1 is moved from the feeding pipe 13 to the heating pipe 32 by the filament moving element 23, and then is heated and melted by the heating system 30 and is extruded from a nozzle 321 at a front end of the heating pipe 32.

In this illustrative embodiment of the present invention, the heating element 31 is electrically connected to the controller 40 and heats the filament 1 by means of electric heating. It can be understood that the heating element 31 may be a heating resistance wire, a heating film, a metal ceramic heating element (MCH), a PTC heating element, or the like. The heat system 30 may further comprises a temperature detector 34 disposed on the heating element 31 for detecting its temperature, so as to facilitate the control of the heating operation of the heating element 31 by the controller 40.

The controller 40 comprises a control circuit board 41 and a control switch 42 which is disposed on the handheld housing 12 of the main body 10 and is electrically connected to the control circuit board 41, the controller 40 is arranged for activating the reciprocating filament moving system 20 to drive the filament moving element 23 to urge the filament 1 to move forward and for activating the heating element 31 to heat the filament 1.

It is worth mentioning that the filament moving element 23 and the filament 1 can be separated from each other in the present invention, so as to facilitate the withdrawing of the unused filament 1 from the feeding pathway 13 of the handheld 3D drawing arrangement, and facilitate the replacement of the filament 1. More specifically, as shown in FIG. 12A to FIG. 13B, the handheld 3D drawing arrangement further comprises an unloading system 50 which comprises an unloading driving assembly 51 arranged to the reciprocating filament moving system 20 and an unloading switch 52, when the unloading switch 52 is operated by a user, the unloading driving assembly 51 separates the filament moving element 23 from the filament 1, so that it is convenient for the user to take out the unused filament 1 from the feeding pathway 11 of the main body 10.

The unloading driving assembly 51 of the unloading system 50 can act on the driving element 222 or act directly on the filament moving element 23. In this embodiment, the unloading driving assembly 51 is used to directly act on the filament moving element 23 and the stopper element 241. More specifically, the unloading driving assembly 51 comprises a pusher element 511 and a reset element 512, the pusher element 511 is connected to the unloading switch 52 and the reset element 512 is used for resetting the pusher element 511.

There is a movement gap 22216 between the filament moving element 23 and the front limiting surface 22214 of the driving frame 2221 of the driving element 222. There is also a movement gap 2425 between the stopper element 241 and the front limit surfaces 2422 of the carrier frame 242, so that when the pusher element 511 acts on rear surfaces of the filament moving element 23 and the stopper element 241 under the driving of the unloading switch 52, the filament moving element 23 and the stopper element 241 are driven to pivotally rotate and are respectively separated from the filament 1, and the movement gaps 22216 and 2425 provide the space for the movement of the filament moving element 23 and the stopper 241 respectively. The elastic limiting element 2224 and the elastic positioning element 243 are respectively implemented as compression springs and are compressed during this process.

When the unloading switch 52 is released, the reset element 512 automatically drives the pusher element 511 back to its original position, and the elastic limiting element 2224 and the elastic positioning element 243 are reset under their own elastic restoring force respectively. Under the action of reset of the elastic limiting element 2224 and the elastic positioning element 243, the filament moving element 23 and the stopper element 241 are respectively reset, so as to keep them in a position where they can be in contact with the filament 1. The reset element 512 can be a spring, a torsion spring and other components, Therefore, the handheld 3D drawing arrangement allows the front end of the filament 1 to leave the heating system 30 and be directly taken out from the feeding pathway 11 by providing a mechanical structure such as the unloading system 50, so as to facilitate the withdrawing the filament 1, thereby the electrode polarity of the driving motor 211 of the reciprocating filament moving system 20 does not need to be set to be variable polarities, so that the filament 1 is taken out unlike the conventional gear driving mechanism or screw driving mechanism that requires to reverse the motor to provide a reversing operation.

In addition, in this embodiment of the present invention, since the filament moving element 23 is in contact with the filament 1 under the action of elastic force, during the preparation operation for loading the filament 1, the handheld 3D drawing arrangement allows the filament 1 to move forward along the feeding pathway 11 until its front end pushes away the filament moving element 23 and reaches the position corresponding to the heating pipe 32 of the heating system 30 of the handheld 3D drawing arrangement, so that it is different from the conventional gear driving mechanism or screw driving mechanism that an additional conveying operation is required to transfer the front end of the filament 1 from the gear driving mechanism or screw driving mechanism to the heating position.

Moreover, in the present invention, the contact area between the driving contact surface 230 of the filament moving element 23 and the filament is relatively small, so that when the handheld 3D drawing arrangement is equipped with a dyeing mechanism and can provide dyeing of multiple colors, the filament moving element 23 is relatively less contaminated with dyes, so that the interference effect when the filament 1 is changed to be dyeing with a different dye is relatively small.

It can be understood that, when the handheld 3D drawing arrangement of this embodiment of the present invention is in use, the filament 1 is directly inserted along the feeding pathway 11 of the main body 10 until its front end reaches the heating pipe 32 of the heating system 30. Then, when the user presses the control switch 42, the power source 21 and the driving assembly 22 of the reciprocating filament moving system 20 enter the working state, and the driving motor 211 of the power source 21 rotates, so that the movement control wheel 2212 of the reciprocation control element 221 is driven to rotate along with the rotation of the driving motor 211 to drive the driving element 222 to move back and forth, so that the driving element 222 drives the filament moving element 23 to move back and forth, so that the filament 1 can be continuously moved forward to the heating system 30 to be heated and melted and discharged from the nozzle 321.

Referring to FIGS. 14 to 30 of the drawings, a handheld 3D drawing arrangement according to a first alternative mode of the above preferred embodiment of the present invention is illustrated. The handheld 3D drawing arrangement specifically comprises a main body 10, a reciprocating filament moving system 20, a heating system 30 and a controller 40. The main body 10 has a feeding pathway 11 for feeding the filament 1 and comprises a handheld housing 12 for manual manipulation to draw in three dimensional space. The reciprocating filament moving system 20 conveys the filament 1 forward to the heating system 30 in the feeding pathway 11 of the main body 10 under the control of the controller 40, the heating system 30 heats the filament 10 under the control of the controller 40, so that the filament 1 is heated to form the melted material that is further extruded from the front end of the main body 10 for 3D drawing works.

More specifically, the feeding pipe 13 includes a first part 131 located on the front side and a second part 132 located on the rear side, the first part 131 and the second part 132 are spaced apart from each other. A filament moving space 133 is formed between the first part 131 and the second part 132 for exposing the filament 1 in the filament moving space 133 for the reciprocating filament moving system 20 to function on the filament 1 to drive the filament 1 to be conveyed forward in the feeding pipe 13.

The reciprocating filament moving system 20 comprises a power source 21, a driving assembly 22 and a filament moving element 23 which is adapted for in contact with the surface of the filament 1 in the working state, and the power source 21 comprises a driving motor 211, an output shaft 212 and a power module 213, the driving assembly 22 comprises a reciprocation control element 221 and a driving element 222, the reciprocation control element 221 is connected to the output shaft 212, so that when the output shaft 212 is driven to rotate, the driving element 222 which is coupled to the reciprocation control element 221 is subject to a reciprocating movement under the action of the reciprocation control element 221, so that the filament moving element 23 synchronizes with the reciprocating movement of the driving element 222 and is used to drive the forward movement of the filament 1.

The reciprocation control element 221 comprises a connecting component 2211 and a movement control wheel 2212, the connecting component 2211 is mounted to the output shaft 212 of the power source 21, and the movement control wheel 2212 is provided on a surface of the connecting component 2211 and is adapted to be driven by the driving motor 211 to rotate synchronously with the rotation of the output shaft 212.

The movement control wheel 2212 comprises a first driving action surface 22121 and a second driving action surface 22122 which are respectively extended in the circumferential direction on its front side and rear side, the driving element 222 comprises a driving frame 2221, and the filament moving element 23 is arranged on the driving frame 2221. The driving frame 2221 comprises a first force bearing surface 22211 at a position corresponding to the first driving action surface 22121, and a second force bearing surface 22212 at a position corresponding to the second driving action surface 22212. There is an engaging groove 22213 between the first force bearing surface 22211 and the second force bearing surface 22212, and a part of the movement control wheel 2212 extends into the engaging groove 22213, so that each of the first driving action surface 22121 and the second driving action surface 22122 has a part of a curved surface extending into the engaging groove 22213. When the movement control wheel 2212 rotates, the first driving action surface 22121 and the second driving action surface 22122 rotate respectively to allow each position on the circumference to pass through the engaging groove 22213 periodically, so as to drive the reciprocating movement of the driving frame 2221.

In the above-mentioned preferred embodiment of the present invention, the movement control wheel 2212 is located at the rear side of the filament moving element 23, but in this variant embodiment, the movement control wheel 2212 is side by side with the filament moving element 23, thereby reducing the size of the reciprocating filament moving system 20.

Correspondingly, along a circumferential direction, the first driving action surface 22121 comprises at least one first peak position 22121a, at least one first valley position 22121b, and at least two first transition surfaces 22121c extended between the adjacent first peak position 22121a and the valley positions 22121b, each of the first transition surfaces 22121c is an inclined surface, an arc surface or a curved surface. Along the circumferential direction, the second driving action surface 22122 comprises at least one second peak position 22122a, at least one second valley position 22122b, and at least two second transition surfaces 22122c extended between the adjacent second peak position 22122a and the second valley position 22122b, each of the second transition surfaces 22122c is an inclined surface, an arc surface or a curved surface.

As shown in FIG. 20 to FIG. 23, in the stage of driving the filament 1 forward in a filament moving cycle, the movement control wheel 2212 rotates, so that the driving element 222 is driven by the first driving action surface 22121, the contact position between the first force bearing surface 22211 and the first driving action surface 22121 changes from the first valley position 22121b to the first peak position 22121a along the first transition surface 22121c, thereby the driving element 222 moves forward, so that the filament moving element 23 provided side by side with the movement control wheel 2212 also moves forward synchronously.

Figure 24:
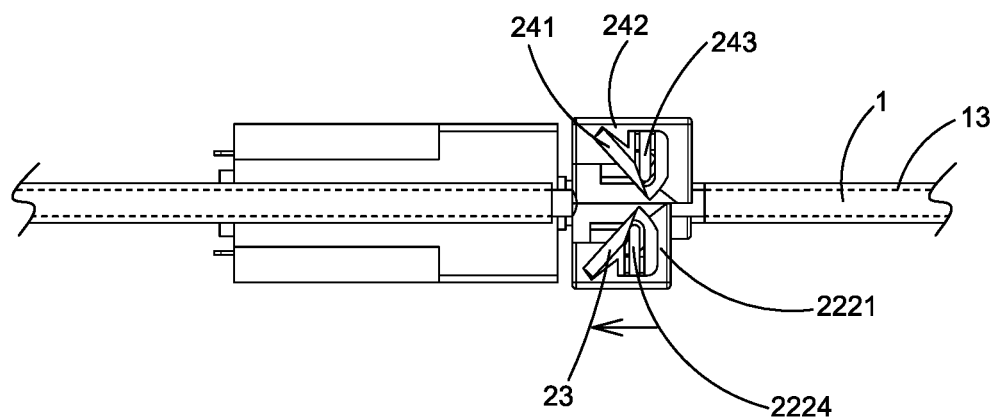
FIG. 24 and FIG. 25 are respectively schematic views illustrating the filament moving element of the reciprocating filament moving system of the handheld 3D drawing arrangement that is backward moving for resetting its position according to the first alternative mode of the above preferred embodiment of the present invention.
Figure 25:
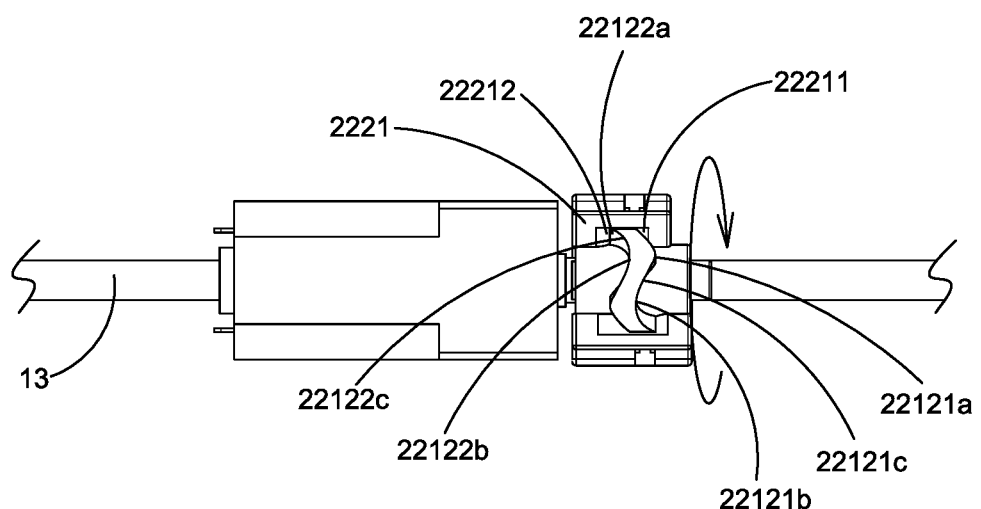
Figure 26:
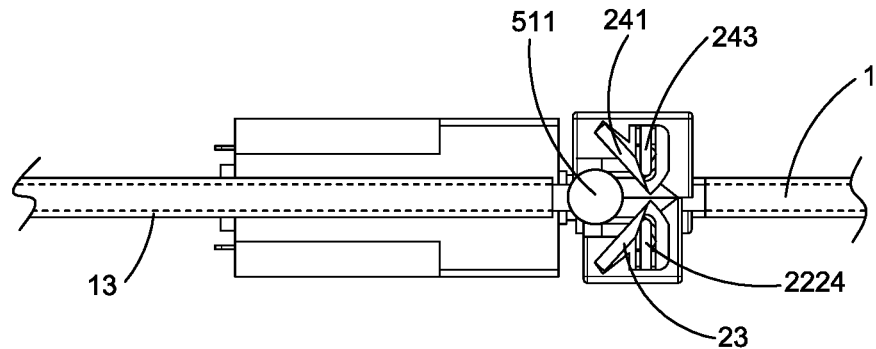
FIGS. 26, 27 and 28 are respectively sectional views illustrating the filament withdrawing process of the handheld 3D drawing arrangement according to the first alternative mode of the above preferred embodiment of the present invention.
Figure 27:
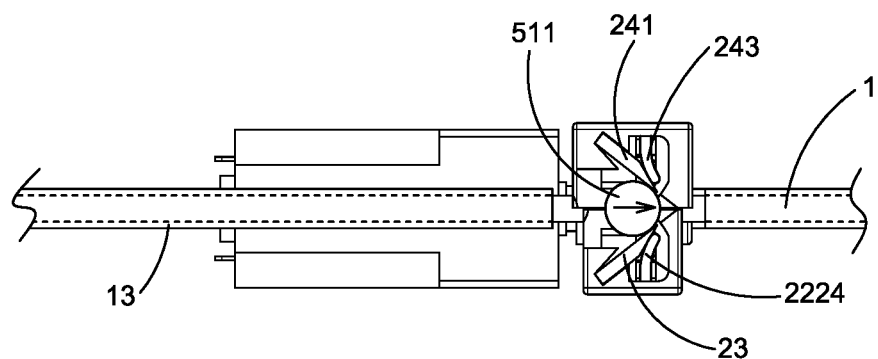

As shown in FIG. 24 to FIG. 25, in a reset stage of the filament moving cycle, the contact position of the second driving surface 22122 with the second force bearing surface 22212 is gradually changed from the second valley position 22122b to the second peak position 22122a along the second transition surface 22122c, the movement control wheel 2212 drives the driving element 222 to move backward, so as to further drive the filament moving element 23 to follow the driving element 222 to move back to its original position.

In this preferred embodiment of the present invention, the driving element 222 has a fixing groove 2222 inclinedly extended at an inner side of the driving frame 2221 for inclinedly fixing the filament moving element 23. The driving element 222 further comprises an elastic limiting element 2224 which is integrally formed by the driving frame 2221. That is, the driving frame 2221 itself has elasticity, and a part of the driving frame 2221 forms the elastic limiting element 2224, a bottom end of the elastic limiting element 2224 is biasing against the filament moving element 23. In the above embodiment, the rear end of the elastic limiting element 2224 which is implemented as a spring is pressed against the filament moving element 23.

In this embodiment, the reciprocating filament moving system 20 further comprises a stopper assembly 24 for preventing the backward movement of the consumable material 1. More specifically, the stopper assembly 24 comprises a stopper element 241 and a carrier frame 242. The stopper element 241, which may have the same structure as the filament moving element 23, comprises a stopper contact surface 2410 which is adapted for in contact with the surface of the filament 1, thereby preventing the retracting action of the filament 1.

Similarly, an assembly groove 2421 is formed at the inner side of the carrier frame 242 and is inclinedly extended for inclinedly fixing the stopper element 241. The stopper assembly 24 further comprises an elastic positioning element 243 which is integrally formed with the carrier frame 242, that is, the carrier frame 242 itself has elasticity, and a part of the carrier frame 242 forms the elastic limiting element 243, a bottom end of the elastic positioning element 243 is biasing against the stopper element 241, so that the stopper element 241 is kept in an inclined state during operation and the stopper contact surface 2410 is kept in frictional contact with the filament 1 to prevent the filament 1 from moving backward.

The handheld casing 12 comprises two parts of housings 121 which are assembled with each other to form the handheld housing 12, and an inner cavity 122 is formed therein for accommodating the feeding pipe 13, the reciprocating filament moving system 20, the heating system 30 and the controller 40.

The main body 10 further comprises an accommodating housing 14 which is installed on the handheld housing 12 for installing the reciprocating filament moving system 20. The driving element 222 is movable with respect to the accommodating housing 14, and the carrier frame 242 of the stopper assembly 24 is fixedly mounted to the accommodating housing 14. The accommodating housing 14 comprises two parts of housings 141 which are assembled with each other to form the accommodating housing 14 having an accommodating cavity 142. The filament moving space 133 and the filament moving element 23 are located in the accommodating cavity 142 of the accommodating housing 14. The accommodating housing 14 further has a retaining groove 144, wherein the front and rear displacement of the driving element 222 is limited in the retaining groove 144, that is, the retaining groove 144 of the accommodating housing 14 plays a role to guide the movement path of the driving element 222.

As shown in FIG. 26 to FIG. 30, the handheld 3D drawing arrangement further comprises an unloading system 50 which comprises an unloading driving assembly 51 disposed to the reciprocating filament moving system 20 and an unloading switch 52 provided on the handheld housing 12 of the main body 10, the unloading driving assembly 51 comprises a pusher element 511 and a connector element 513, the pusher element 511 is operatively connected to the unloading switch 52.

Figure 28:
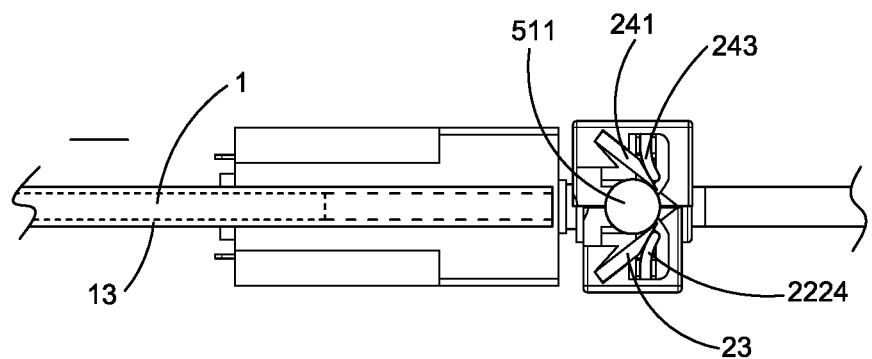
Figure 29:
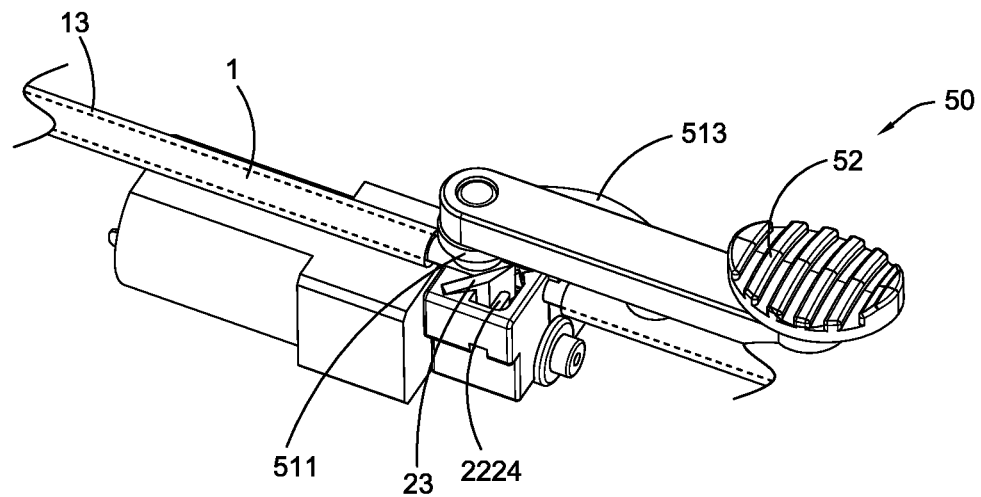
FIG. 29 and FIG. 30 are respectively perspective views illustrating the filament withdrawing process of the handheld 3D drawing arrangement according to the first alternative mode of the above preferred embodiment of the present invention.
Figure 30:
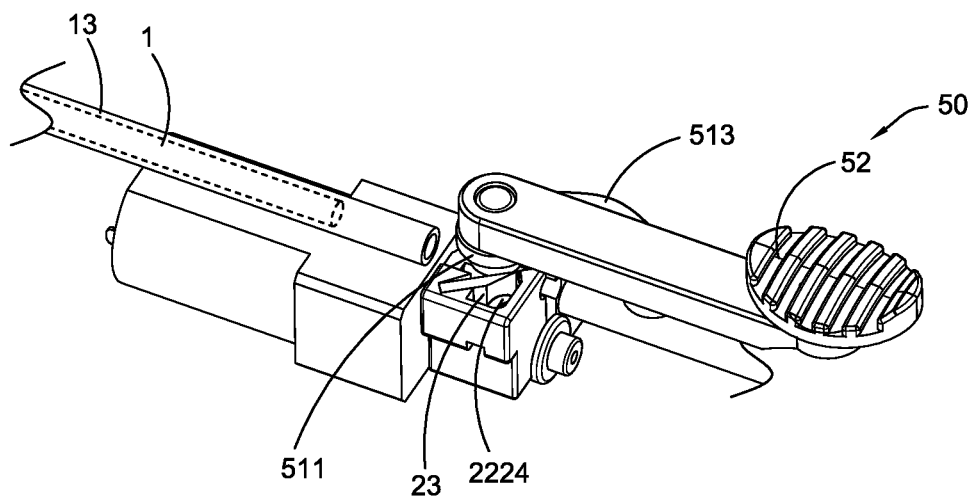

When sliding the unloading switch 52, the pusher element 511 acts on the rear surfaces of the filament moving element 23 and the stopper element 241 under the driving of the sliding unloading switch 52, the filament element 23 and the stopper element 241 are respectively driven to pivotally rotate to be separated from the filament 1, and the elastic limiting element 2224 and the elastic positioning element 243 are elastically deformed. As shown in FIG. 28 and FIG. 30, when the filament moving element 23 and the stopper element 241 are separated from the filament 1, the filament 1 can be removed along the feeding pathway 11, so as to be taken out from the handheld housing 12. When the unloading switch 52 is slid to its initial position, the elastic restoring force of the elastic limiting element 2224 and the elastic positioning element 243 are respectively used to reset the filament moving element 23 and the stopper element 241.

Figure 31:
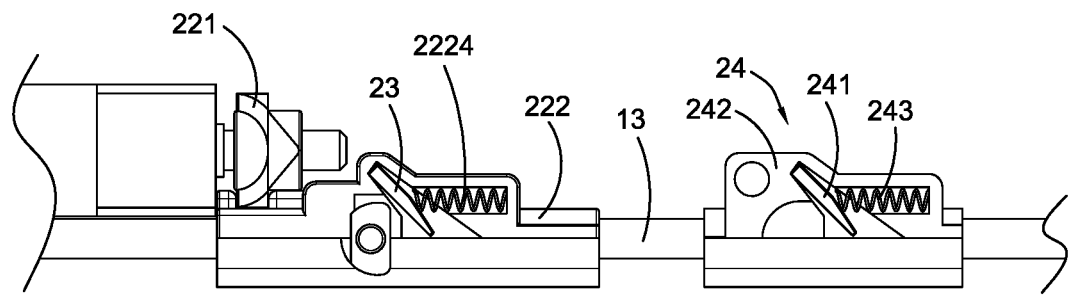
FIG. 31 is a perspective view of the handheld 3D drawing arrangement according to a second alternative mode of the above preferred embodiment of the present invention.

As shown in FIG. 31, a handheld 3D drawing arrangement according to a second alternative mode of the above mentioned preferred embodiment of the present invention is illustrated. In this embodiment, the difference from the above-mentioned embodiment is that in the above-mentioned embodiment, the driving element 222 and the stopper assembly 24 are arranged side by side and on opposite sides of the feeding pipe 13, but in this embodiment, the driving element 222 and the stopper assembly 24 may be arranged along the feeding pipes 13 in a manner that they are arranged with one behind the other and are located on the same side of the feeding pipe 13.

The filament moving element 23 and the stopper element 241 are located on the same side of the feeding pipe 13 and are arranged with one behind the other, for example, the driving element 222 and the filament moving element 23 are located at a rear side of the stopper assembly 24, the driving element 222 and the stopper assembly 24 are respectively sleeved with the feeding pipe 13, and a movement distance is reserved between the stopper assembly 24 and the driving element 222 for the back and forth reciprocating movement of driving element 222.

Figure 32:
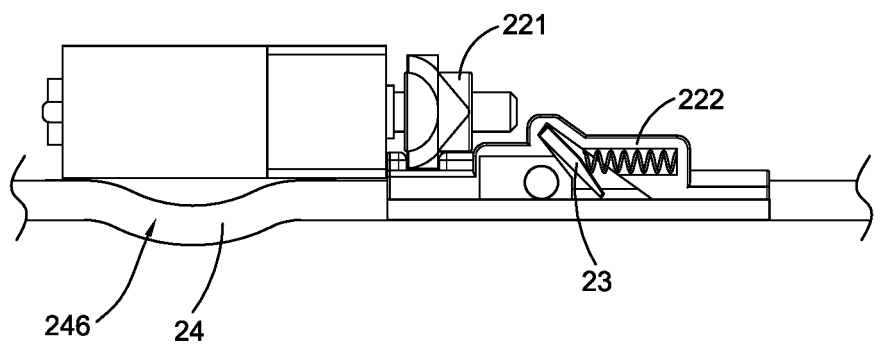
FIG. 32 is a perspective view of the handheld 3D drawing arrangement according to a third alternative mode of the above preferred embodiment of the present invention.

As shown in FIG. 32, a handheld 3D drawing arrangement according to a third alternative mode of the above preferred embodiment of the present invention is illustrated. In this embodiment, the handheld 3D drawing arrangement comprises a stopper assembly 24 which does not have the aforementioned stopper element 241 which is implemented as a blade. The stopper assembly 24 can prevent the backward displacement of the filament 1 in other ways, for example, in the embodiment shown in FIG. 32, the stopper assembly has a curved channel 245, during the backward reset process of the filament moving element 23, an inner surface around the curved channel 246 can generate a frictional force on the filament 1, thereby preventing the filament 1 from moving backward.

Figure 33:
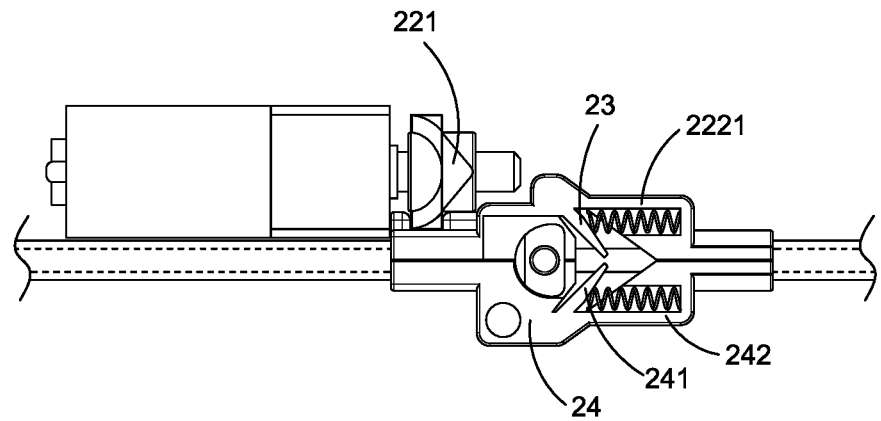
FIG. 33 is a perspective view of the handheld 3D drawing arrangement according to a fourth alternative mode of the above preferred embodiment of the present invention.

As shown in FIG. 33, a handheld 3D drawing arrangement according to a fourth alternative mode of the above preferred embodiment of the present invention is illustrated. In this embodiment, the filament moving element 23 is in the shape of a flat plate, and is integrally formed with the driving frame 2221. The stopper element 241 is in the shape of a flat plate, and is integrally formed with the carrier frame 242.

Figure 34:
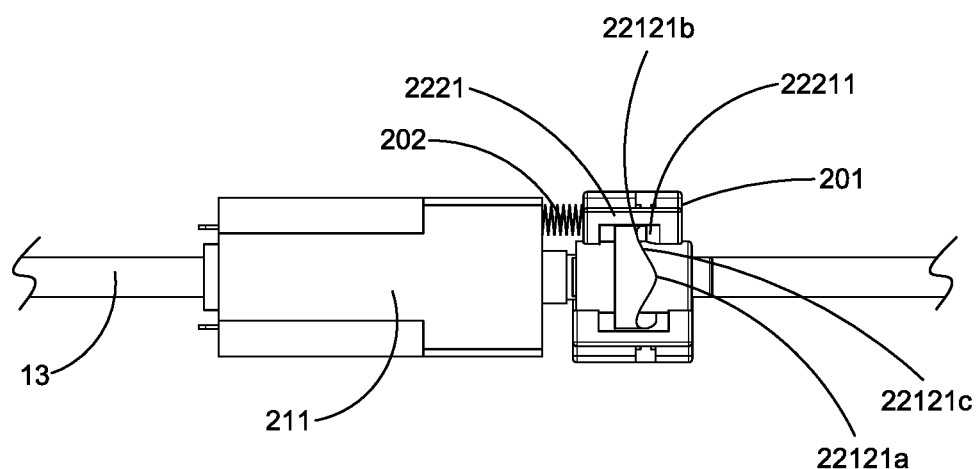
FIG. 34 is a perspective view of the handheld 3D drawing arrangement according to a fifth alternative mode of the above preferred embodiment of the present invention.

As shown in FIG. 34, a handheld 3D drawing arrangement according to a fifth alternative mode of the above preferred embodiment of the present invention is illustrated. In this embodiment, the reciprocating filament moving system 20 comprises a forward movement driving mechanism 201 and a rear movement driving mechanism 202, the forward movement driving mechanism 201 comprises the power source 21 and the driving assembly 22 in the above embodiment, the movement control wheel 2212 of the driving assembly 22 has one side which is provided with the first driving action surface 22121, and the other side does not have the second driving action surface 22122. The driving frame 2221 only has the first force bearing surface 22211 and does not have the second force bearing surface 22212. When the movement control wheel 2212 rotates, the driving frame 2221 is driven to move forward, and the driving frame 2221 drives the filament moving element 21 to move forward.

The backward movement driving mechanism 202 may be implemented as a restoring elastic element such as a restoring spring, one end of which is connected to the driving frame 2221, and the other end thereof is connected to the accommodating housing 14 or the housing of the driving motor 211. In a filament moving cycle, when the forward movement driving mechanism 201 drives the filament moving element 23 to move forward, the restoring spring is deformed. When the filament moving element 23 reaches the maximum displacement position of forward movement, the elastic restoring force of the restoring spring drives the driving frame 2221 to move backward, so as to realize the backward return of the filament moving element 23.

Correspondingly, the present invention provides a method for discharging a 3D drawing material by a handheld 3D drawing arrangement, and the method comprises a filament loading and preparation step, a filament feeding step, and a melting and discharging step. In the filament loading and preparation step, the filament 1 is inserted into the feeding pathway 11 of the main body 10 until the front end of the filament 1 reaches a heating pipe 32. In the step of conveying and feeding the filament, the filament 1 is driven to move forward by the reciprocating moving element 23 of the reciprocating filament moving system 20. In the heating and melting step, the filament 1 that is driven forward is heated and melted in the heating system 30 and discharged from the nozzle 321.

In the filament loading and preparation step, the front end of the filament 1 enters from the second part 132 of the feeding pipe 13, and is conveyed to pass through the filament moving space 133 located in the reciprocating filament moving system 20 between the first part 131 and the second part 132 of the feeding pipe 13, and then reaches to the heating pipe 32 through the first part 131 of the feeding pipe 13. Therefore, it is unlike the conventional 3D drawing pen that requires additional steps for sending the filament 1 from the position corresponding to the feeding structure to the heating position.

In the step of conveying and feeding the filament, the forward displacement of the filament 1 is driven by the filament moving element 23 that can be displaced back and forth. The implementation manner of the forward and backward displacement of the filament moving element 23 may be achieved by various possible structures. Its front and rear displacement can be realized by different driving components to move forward and backward respectively, or the same driving component can be used to realize both of the forward and backward movement. For instance, the driving frame 2221 of the driving element 222 is driven to move back and forth, thereby driving the filament moving element 23 to move back and forth.

In addition, in the present invention, the method can also comprises a filament withdrawing step, when the unloading switch 52 is moved, it can drive the pusher element 511 to push the filament moving element 23 and the stopper element 241 respectively to separate them from the filament 1, so that it is convenient for the user to take out the unused filament 1 from the heating position through the feeding pathway 11.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A handheld 3D drawing arrangement for heating and melting a solid filament for drawing a 3D object, comprising:
   a main body comprising a handheld housing and having a feeding pathway within said handheld housing;
   a reciprocating filament moving system comprising a filament moving element which is capable of being driven to reciprocating move;
   a heating system; and
   a controller, wherein under control of said controller, said reciprocating filament moving system is operated to allow said filament moving element to reciprocating move, so as to drive the filament to be feed to the heating system through said feeding pathway, so that the filament is heated and melted by the heating system for drawing the 3D object, wherein said filament moving element is a blade which is inclinedly arranged with respect to said feeding pathway, wherein when said filament moving element is driven to move forward, the filament is driven to move forward along with said filament moving element, and when said filament moving element is driven to move backward, said filament moving element does not drive the filament to move forward.

2. The handheld 3D drawing arrangement according to claim 1, wherein said reciprocating filament moving system comprises a forward movement driving mechanism and a backward movement driving mechanism, wherein during a filament moving cycle, said forward movement driving device is arranged to drive said filament moving element to move forward, said backward movement driving mechanism is arranged to drive said filament moving element to move backward.

3. The handheld 3D drawing arrangement according to claim 1, wherein said reciprocating filament moving system comprises a power source and a driving assembly which periodically drives said filament moving element to move back and forth with energy provided by said power source.

4. The handheld 3D drawing arrangement according to claim 3, wherein said power source comprises a power module, a driving motor and an output shaft, wherein said driving assembly comprises a reciprocation control element and a driving element, wherein said driving motor is powered by an electric energy provided by said power supply module to rotate, and said reciprocation control element is connected to said output shaft, so as to rotate synchronously with said driving motor and to drive said driving element to move back and forth in order to drive said filament moving element to move back and forth.

5. The handheld 3D drawing arrangement according to claim 4, wherein said reciprocation control element comprises a movement control wheel comprising a first driving action surface which is a curved surface, and said driving element comprises a first force bearing surface, wherein when said movement control wheel rotates, said first driving action surface is rotating to act on said corresponding first force bearing surface to drive said driving element to move forward, thereby driving said filament moving element to move forward.

6. The handheld 3D drawing arrangement according to claim 5, wherein said movement control wheel comprises a second driving action surface which is a curved surface, and said first driving action surface and said second driving action surface are located on two opposite sides of said movement control wheel, wherein said driving element comprises a second force bearing surface, wherein when said movement control wheel rotates, said second driving action surface is rotating to act on said corresponding second force bearing surface, and said driving element is driven to move backward so as to drive said filament moving element to move backward.

7. The handheld 3D drawing arrangement according to claim 6, wherein said driving element comprises a driving frame having an engaging groove, and said first force bearing surface and said second force bearing surface are located at two opposite sides of said engaging groove, wherein positions of said first driving action surface and said second driving action surface are driven to periodically rotate into said engagement groove to respectively have contact with said first force bearing surface and said second force bearing surface.

8. The handheld 3D drawing arrangement according to claim 7, wherein each of said first driving action surface and said second driving action surface has at least one peak position, at least one valley position, and at least two transition surfaces between adjacent said peak position and said valley position, wherein said at least one peak position and said at least one valley position of said first driving action surface are respectively aligned with said at least one valley position and said at least one peak position of said second driving action surface at two opposite sides of said movement control wheel.

9. The handheld 3D drawing arrangement according to claim 8, wherein each of said at least two transition surfaces is a parabolic curved surface.

10. The handheld 3D drawing arrangement according to claim 1, wherein said filament moving element has a driving contact surface for having frictional contact with the filament to urge drive the filament to move forward.

11. The handheld 3D drawing arrangement according to claim 4, wherein said driving element has a fixing groove, wherein said filament moving element is installed in said fixing groove, wherein said filament moving element has a driving contact surface for having frictional contact with the filament to drive the filament to move forward.

12. The handheld 3D drawing arrangement according to claim 8, wherein said filament moving element is a flat plate and is integrally formed with said driving frame, wherein said filament moving element, which is inclinedly arranged with respect to said feeding pathway, has a driving contact surface for having frictional contact with the filament to drive the filament to move forward.

13. The handheld 3D drawing arrangement according to claim 10, wherein said reciprocating filament moving system further comprises an elastic limiting element which is biasing against said filament moving element to keep said filament moving element being in contact with the filament.

14. The handheld 3D drawing arrangement according to claim 7, wherein said reciprocating filament moving system further comprises an elastic limiting element which is integrally formed with said driving frame and is biasing against said filament moving element to keep said filament moving element being in contact with the filament.

15. The handheld 3D drawing arrangement according to claim 1, wherein said reciprocating filament moving system further comprises a stopper system which comprises a stopper element and a carrier frame located in said main body, wherein said stopper element comprises a stopper contact surface adapted to have frictional contact with the filament to prevent backward movement of the filament in said feeding pathway.

16. The hand-held 3D drawing arrangement according to claim 15, wherein said carrier frame has an assembly groove, wherein said stopper element is a blade which is installed in said assembly groove and is inclinedly arranged with respect to said feeding pathway, wherein said stopper system further comprises an elastic positioning element which is biasing against said stopper element to keep said stopper element being in contact with the filament.

17. The handheld 3D drawing arrangement according to claim 1, further comprising an unloading system which comprises an unloading switch and an unloading driving assembly, wherein said unloading switch is operated to drive said unloading driving assembly to move, wherein said unloading drive assembly comprises a pusher element which is arranged to act on said filament moving element to separate said filament moving element from the filament, so that the filament is capable of being retreated from said feeding pathway.

18. The handheld 3D drawing arrangement according to claim 15, further comprising an unloading system which comprises an unloading switch and an unloading driving assembly, wherein said unloading switch is operated to drive said unloading driving assembly to move, wherein said unloading drive assembly comprises a pusher element which is arranged to act on said filament moving element and said stopper element to separate said filament moving element and said stopper element from the filament, so that the filament is capable of being retreated from said feeding pathway.

19. The handheld 3D drawing arrangement according to claim 4, wherein said main body further comprises an accommodating housing, wherein said reciprocating filament moving system is assembled to said accommodating housing, wherein said accommodating housing has a retaining groove to guide said driving element to slide in said retaining groove.

20. The handheld 3D drawing arrangement according to claim 4, wherein said main body further comprises an accommodating housing having a limiting hole, wherein said reciprocating filament moving system is assembled to said accommodating housing, wherein said driving element comprises a driving retaining end portion which passes through said limiting hole and is subject to move back and forth in said limiting hole, wherein said main body comprises a feeding pipe which defines said feeding pathway, wherein said feeding pipe comprises a first part and a second part which are spaced apart from each other to form a filament moving space, wherein said filament moving element is adapted to act on a part of the filament located in said filament moving space to drive the filament to move forward.

* * * * *